US008348622B2

(12) United States Patent
Bech

(10) Patent No.: US 8,348,622 B2
(45) Date of Patent: Jan. 8, 2013

(54) WIND TURBINE BLADES MADE OF TWO SEPARATE SECTIONS, AND METHOD OF ASSEMBLY

(75) Inventor: Anton Bech, Ringkøbing (DK)

(73) Assignee: Vestas Wind Systems A/S, Aarhus N (DK)

( * ) Notice: Subject to any disclaimer, the term of this patent is extended or adjusted under 35 U.S.C. 154(b) by 815 days.

(21) Appl. No.: 11/629,795

(22) PCT Filed: Jun. 30, 2004

(86) PCT No.: PCT/DK2004/000467
§ 371 (c)(1),
(2), (4) Date: Dec. 15, 2006

(87) PCT Pub. No.: WO2006/002621
PCT Pub. Date: Jan. 12, 2006

(65) Prior Publication Data
US 2008/0069699 A1    Mar. 20, 2008

(51) Int. Cl.
*F03D 1/06* (2006.01)
*F01D 5/14* (2006.01)
(52) U.S. Cl. ................. 416/229 R; 416/223 R
(58) Field of Classification Search .......... 290/44, 290/55; 415/206; 416/2, 229 R, 230
See application file for complete search history.

(56) References Cited

U.S. PATENT DOCUMENTS

| | | | | | |
|---|---|---|---|---|---|
| 3,101,290 | A | * | 8/1963 | Paul | 156/137 |
| 4,120,998 | A | * | 10/1978 | Olez | 428/33 |
| 4,474,536 | A | | 10/1984 | Gougeon et al. | |
| 4,976,587 | A | * | 12/1990 | Johnston et al. | 416/230 |
| 5,499,904 | A | * | 3/1996 | Wallace et al. | 416/230 |
| 6,287,122 | B1 | * | 9/2001 | Seeram et al. | 433/220 |
| 6,638,466 | B1 | * | 10/2003 | Abbott | 264/238 |
| 7,334,989 | B2 | * | 2/2008 | Arelt | 416/2 |
| 7,364,407 | B2 | * | 4/2008 | Grabau et al. | 416/229 R |

FOREIGN PATENT DOCUMENTS

| | | |
|---|---|---|
| DE | 102 35 496 | 2/2004 |
| EP | 1 184 566 | 3/2002 |

(Continued)

OTHER PUBLICATIONS

International Search Report; PCT/DK2004/000467; Aug. 4, 2005.
D.A. Griffin, T.D. Ashwill: "Alternative Composite Materials for Megawatt-Scale Wind Turbine Blades: Design Considerations and Recommended Testing" 2003 ASME Wind Energy Symposium, AIAA/ASME, 'Online! 2003, XP002321843 Retrieved from the Internet: URL:www.sandia.gov/wind/asme/AIAA-2003-0696.pdf> 'retrieved on Mar. 3, 2005! p. 6, col. 2, paragraph 2—p. 8, col. 2, paragraph 2.

*Primary Examiner* — Edward Look
*Assistant Examiner* — Sean J Younger
(74) *Attorney, Agent, or Firm* — Wood, Herron & Evans, LLP

(57) ABSTRACT

The invention relates to a wind turbine blade comprising at least two wind turbine blade sections that include one or more strengthening structures, the ends of the strengthening structures being connected in a connection joint. The ends include corresponding connection surfaces, the one or more relevant dimensions of the surfaces being larger than the dimensions of the transverse surfaces of the strengthening structures at the ends. The one or more relevant dimensions of the connection joint are larger than that of the adjacent strengthening structure. The invention also relates to a wind turbine blade in which the at least two wind turbine blade sections include a number of substantially oblong carbon fiber strips and strips of one or further materials such as wood or glass fiber. The invention further relates to a wind turbine blade section, an assembly plant for assembling wind turbine blade sections and to a method and use of such wind turbine blades.

29 Claims, 14 Drawing Sheets

FOREIGN PATENT DOCUMENTS

| | | |
|---|---|---|
| FR | 1 070 262 | 7/1954 |
| JP | 2003 214322 | 7/2003 |
| JP | 2004 011616 | 1/2004 |
| NL | 1 001 200 | 3/1997 |
| WO | WO 95/20104 | 7/1995 |
| WO | WO 03/078832 | 9/2003 |
| WO | WO 03/093672 | 11/2003 |
| WO | WO 2004/078461 | 9/2004 |

* cited by examiner 14, 15

WIND TURBINE BLADES MADE OF TWO SEPARATE SECTIONS, AND METHOD OF ASSEMBLY

BACKGROUND OF THE INVENTION

The invention relates to wind turbine blades, a wind turbine section, method and use hereof.

DESCRIPTION OF THE RELATED ART

Wind turbine blades are very important components in a modern wind turbine and are highly important in defining the energy production and the lifespan of the wind turbine. However, the increasing size of modern wind turbines has also resulted in still longer and heavier wind turbine blades. The transport of the blades from the place of production to the place of erecting the wind turbine is thus a matter that requires a lot of consideration e.g. in choosing the right routes in relation to the characteristics of the blade such as the length, height and weight of the blade. Further, the transport requires more and more specialized equipment in handling the wind turbine blades.

Consequently, transport of wind turbine blades adds challenges and costs to the process of erecting wind turbines.

The prior art includes a number of solutions in making wind turbine blades easier to transport to the place of erecting a wind turbine.

U.S. Pat. No. 4,474,536 discloses for example the manufacture of wind turbine blades in which each blade comprises two sections. The sections are individually shipped to the place of erecting the wind turbine and assembled to wind turbine blades. The blade surfaces at the section areas to be jointed comprise a number of corresponding slots. The sections are assembled by entering wood block splices and adhesive means into the slots. The corresponding slots and wood block splices comprise a diamond shape and the splices may thus close the slots.

A problem with the prior art and especially with the above-mentioned US patent is the low strength and rigidity that restricts the use in connection with most modern wind turbine blades.

BRIEF SUMMARY OF THE INVENTION

The invention establishes a wind turbine blade technique without the above-mentioned disadvantages. Further, to the invention establishes a technique which is advantageous in connection with large wind turbine blades and especially in connection with the forces they face during normal use.

THE INVENTION

The invention relates to a wind turbine blade comprising at least two wind turbine blade sections that include one or more strengthening structures, the ends of said strengthening structures being connected in a connection joint,
wherein said ends include corresponding connection surfaces, the one or more relevant dimensions of said surfaces being larger than the dimensions of the transverse surfaces of the strengthening structures at said ends, and
wherein one or more of said relevant dimensions of said connection joint is enlarged in relation to the adjacent strengthening structure.

A wind turbine blade is hereby established without the above-mentioned disadvantages.

The enlarged corresponding connection surfaces at the connection joint between the strengthening structures is advantageous as the hold between the surfaces is increased significantly. By the very large corresponding connection surfaces in relation to the transverse surface of the blade it is possible to reestablish the strength of the wind turbine blade. Consequently, it is ensured that the wind turbine blade and the connection joint may sustain the forces of normal use as well as during extreme situations such as extreme meteorological situations.

Further, the larger corresponding connection surfaces ensure that the adhering means connects the surfaces in a more advantageous and stronger manner in comparison to connection of transverse surfaces. The connection of the corresponding connection surfaces will experience sideway forces trying to slide the surfaces from each other wherein the connection of transverse surfaces will experience perpendicular forces trying to pull the surfaces directly apart. Adhering means are always much stronger in relation to sideway forces and connection joint will thus sustain more forces without breaking.

Even further, a resulting enlargement in the surface of the wind turbine blade goes against teaching within the technical area. The fully smooth surface of a wind turbine blade has up to now been considered a necessity. However, the size of the wind turbine blade diminishes the aerodynamic results of the enlargement. The advantages in transporting the blade further compensate for the aerodynamic results of the enlargement.

The phrase "strengthening structure" is generally to be understood as any structure in or inside the wind turbine blade which carries a substantial part of the forces from the wind energy.

The phrase "transverse surfaces of the strengthening structures" is generally to be understood as the surface which would arise if the wind turbine blade was cut in two by a perpendicular cut in relation to the longitudinal direction of the blade. The surface is seen as the substantially smallest surface that may be established by dividing the wind turbine blade at a given position.

The term "adjacent" is generally to be understood as the closest position from the connection joint in which the wind turbine blade and/or the internal strengthening structure have resumed its normal shape. Consequently, the relation between the transverse connection joint and the adjacent strengthening structure may be seen as comparable dimensions e.g. adjacent length (thickness) values on the same longitudinal line of the wind turbine blade.

In an aspect of the invention the ends of said strengthening structures of the blade sections are shaped as a number of corresponding or partly corresponding dentated ends. Hereby it is possible to create a connection joint with a much higher tensile strength as the longitudinal forces of the blade is transferred to longer, larger and no-perpendicular connections of the sections.

In another aspect of the invention, the teeth of said dentated ends are shaped as triangles such as right-angled and/or equilateral triangles, four-sided teeth such as rectangles, round shapes or more free-hand shapes as well as combination of different shapes e.g. a combination of a rectangular shape and a triangular shape at the tip or a combination of different triangular shapes. Hereby it is possible to establish corresponding dentated ends with large surfaces which at same time are easy to manufacture and connect.

In a further aspect of the invention, the sides of the teeth comprise a pie shape such as rounded or wedge shaped teeth e.g. in order to establish corners in a strengthening structure.

The teeth will require less precision in manufacturing, be cost-efficient and still allow large connection surfaces to be established.

In a further aspect of the invention, said dentated ends partly corresponding to each other and the cavities are filled with one or more intermediate connection means e.g. triangular or diamond shaped blocks. Hereby, it is possible to diminish the length (or connection area) of the teeth of the dentated ends as the intermediate connection means establish some of the necessary length. If the intermediate connection means for example are of the same length as the dentated ends they will together be comparable in strength to ends (without the means) of the double length. As the manufacturing and connection complexity increase with the length of the ends it is possible to create an advantageous connection joint by combining the dentated ends with the intermediate connection means. Further, the enlarged connection joint allow the dentated ends to be diminished even more without increasing the manufacturing and connection complexity.

In an even further aspect of the invention, adhering means, such as a two-component epoxy adhesive, adheres the corresponding dentated ends and/or said one or more intermediate connection means to each other. The use of adhering means on the large corresponding surfaces is especially advantageous in comparison to "limited" connections e.g. use of bolts or the like.

In further aspects of the invention, said one or more relevant dimensions of said connection surfaces, transverse surfaces, connection joint and adjacent strengthening structure may be area, length or thickness values and is larger than that of the adjacent strengthening structure in direction of the root of the wind turbine blade.

In an even further aspect of the invention, the length l of one of said teeth in an enlarged connection joint is given by $$\ell \geq \frac{\sigma_{carbon} \cdot h_1 \cdot b}{\tau_{epoxy} \cdot h_2 \cdot 2} = \frac{1000 \cdot h_1 \cdot b}{10 \cdot h_2 \cdot 2} = 50 \frac{h_1}{h_2} \cdot b$$

in which the $h_1$ is the adjacent height of the strengthening structure and $h_2$ is the enlarged height of said tooth at the same width b, said height $h_2$ being between 2 and 10 and preferably between 3 to 6 times the size of $h_1$ such as 3 times. Hereby, is achieved a preferable length of the teeth. Too many short teeth are impractical due to the cross-sectional area of the cutting tool and too long teeth will cause slenderness and it will be difficult to control vibrations or deflection during the manufacture process.

In an aspect of the invention, the number of teeth in the dentated ends is between 25 and 200 per meter of strengthening structure such as circa 100 per meter i.e. b per tooth circa 10 millimeters. The optimal number of teeth is the largest number of teeth (and thus connection area) per meter that still may be advantageously and easily manufactured.

In a further aspect of the invention, said one or more strengthening structures comprise an internal beam strengthening structure, an internal strengthening structure at the trailing edge and/or an internal strengthening structure of a surface shell structure including a plurality of oblong strips imbedded in the blade surface such as carbon, wood and/or glass fiber strips. Hereby are advantageous embodiments of the invention achieved, as stronger and lighter wind turbine blades may be established with the choices in strengthening structure and material and consequently the blades become even easier to transport.

In an even further aspect of the invention, the enlargement of said connection joint is symmetrical in relation to the adjacent strengthening structure such as a symmetrical in- and outwardly expansion in relation to the course of the adjacent strengthening structure. Hereby it is possible to achieve a connection joint which may transfer longitudinal forces without creating torsional or turning forces in the connection joint.

The invention also relates to a wind turbine blade comprising at least two wind turbine blade sections that include one or more strengthening structures with a number of substantially oblong carbon fiber strips and strips of one or further materials such as wood or glass fiber, wherein the ends of said strengthening structures being connected in a connection joint, and wherein said ends include corresponding connection surfaces, one or more relevant dimensions of said surfaces being larger than the dimensions of the transverse surfaces of the strengthening structures at said ends.

A wind turbine blade is hereby established without the above-mentioned disadvantages.

The use of strips of carbon fibers in wind turbine blade sections and consequently separating and connecting the carbon fibers again goes against teaching within the technical area. However, the establishing of larger corresponding connection surfaces at the connection joint between the strengthening structures increases the tensile strength significantly. Hereby it is ensured that the wind turbine blade and the connection joint may sustain the forces of normal use as well as during extreme situations such as extreme meteorological situations.

Further, the larger corresponding connection surfaces ensure that the adhering means connects the surfaces in a more advantageous and stronger manner in comparison to a connection of transverse surfaces. The connection of the corresponding connection surfaces will experience sideway forces trying to slide the surfaces from each other wherein the connection of transverse surfaces will experience perpendicular forces trying to pull the surfaces directly apart. Adhering means are always much stronger in relation to sideway forces and connection joint will thus sustain more forces without breaking.

In aspects of the invention, the carbon fibers of said substantially oblong carbon fiber strips in each wind turbine blade section are unbroken. Further, the corresponding ends of said carbon fiber strips are connected and the corresponding ends of said strips of one or further materials are connected in the connection joint. The unbroken nature of the carbon strips in each section is chosen in order to use the full strength of the material and the corresponding strips reestablish the full strength of the connected strips by the enlarged corresponding surfaces in the connection joint.

In aspects of the invention, the corresponding ends of said carbon fiber strips are connected and the corresponding ends of said strips of one or further materials are connected in the connection joint and the ends of said strengthening structures of the blade sections are shaped as a number of corresponding or partly corresponding dentated ends.

In aspects of the invention, the teeth of said dentated ends are shaped as triangles such as right-angled and equilateral triangles, four-sided teeth such as rectangles, round or more free-hand shapes as well as combination of different shapes e.g. a combination of a rectangular shape and a triangular shape at the tip or a combination of different triangular shapes and the sides of the teeth comprise a pie shape such as rounded or wedge shaped teeth e.g. in order to establish corners in a strengthening structure.

In another aspect of the invention, the length of one of said teeth in a connection joint is given by $$\ell \geq \frac{\sigma_{carbon} \cdot b}{\tau_{epoxy} \cdot 2} = \frac{1000 \cdot b}{10 \cdot 2} = 50 \cdot b$$

in which the height of the connection joint and the adjacent height of the strengthening structure are the same or substantially the same. The relation between length and width of the teeth establishes the necessary strength in the connection joint.

In further aspect of the invention, the number of teeth in the dentated ends is between 25 and 200 per meter of blade surface such as circa 100 per meter i.e. b per tooth circa 10 millimeters. The relationship ensures that the necessary strength is present in the connection joint in relation to the general strength of the wind turbine blade in which a lower value will create a less robust connection and a higher value will increase the manufacturing costs significantly.

In an aspect of the invention, said dentated ends partly corresponding to each other and the cavities are filled with one or more intermediate connection means e.g. triangular or diamond shaped blocks. The use of blocks, such as blocks in a carbon material, allows the necessary corresponding surfaces in the connection joint to be established.

In a further aspect of the invention, adhering means, such as two-component epoxy adhesive, adheres the corresponding dentated ends and/or said one or more intermediate connection means to each other. Hereby is an advantageous embodiment of the invention achieved.

In an even further aspect of the invention, said connection joint is enlarged in relation to the adjacent strengthening structure. Hereby, it is possible to establish a very strong connection by combining the use of carbon fiber strips with an enlarged connection joint i.e. combining strength with larger surfaces.

The invention also relates to a wind turbine blade section to be used in a wind turbine blade, said blade section comprising a strengthening structure with an end including a connection surface for connection to another blade section, one or more relevant dimensions of said surface being larger than the dimensions of the transverse surfaces of the strengthening structures at said end, and wherein said structure end includes a connection surface applied with connection means concealed behind a removable cover.

Modern wind turbine blades may easily exceed a length of 40 meters and thus normally require very long manufacturing halls. By manufacture each wind turbine blade in individual sections it is possible to reduce the dimensions of the manufacturing plant. Further, the transportation of the blade is enhanced considerably in the manufacturing plant as well as the transporting to the place of erecting the wind turbine by using blade sections.

The connection surface of the wind turbine blade may be provided with the necessary connection means and the concealing cover at the manufacturing plant. Hereby it is possible to control the circumstances under which the connection means is applied and concealed, and thus ensure that the optimal environment is present during the process.

In an aspect of the invention, said connection means is adhering means such as two-component epoxy adhesive which is concealed behind air tight plastic layers of a removable cover. Hereby, it may be ensured that the connection means is contained in a protected environment until the blade section reaches the place of erecting the wind turbine.

In another aspect of the invention, the connection joint is covered with a cover surface such as a few layers of glass fiber. The cover may serve as a reestablishment of the aerodynamic profile for the blade surface at the connection joint as well as protect the connection joint.

The invention also relates to an assembly plant for wind turbine blade sections, said plant comprising means in order to position the wind turbine blade sections in relation to each other such in order to create a connection joint between the sections, enclosure for at least enclosing the connection joint of the wind turbine blade sections, and means for controlling one or more environmental values within the enclosure.

The assembly plant is advantageous as it may establish the necessary surroundings in order to connect the wind turbine blade sections at the place of erecting the wind turbines or at a nearby place e.g. at a local plant. The necessary means are all such that they may be transported to the place with one or a few trucks and subsequently be dismantled and moved to a new place.

In an aspect of the invention, said means for controlling one or more environmental values include a heat supply and humidity control, sensors e.g. temperature and humidity sensors and control means for controlling the adhesive process. By controlling the temperature and humidity it is possible to enhance or accelerate the bonding process and thus create a stronger adhesive connection between the sections.

In an aspect of the invention, said means to position the wind turbine blade sections include actuators for moving at least one section in a vertical and horizontal plane in relation to another section, position measuring means such as a transmitter and receiver positioned on a wind blade section, respectively as well as transmitter and receiver means and control means. The use of actuators in each end of the sections is advantageous as the sections must be aligned perfectly before they are forced against each other in order to establish a strong connection. The transmitter is preferably a laser beam in order to enhance the precision of the section positioning process.

In an aspect of the invention, said enclosure is a tent tightly enclosing the connection joint in relation to temperature and/or humidity. The use of a tent is advantageous as it establish the necessary enclosure around the connection joint. Further, it is cost efficient and compact during transport.

The invention also relates to a method of assembling wind turbine blade sections to wind turbine blades in a place different from the manufacturing place of said wind turbine blade sections, said method comprising the steps of:

creating at least one connection surface in one end of a strengthening structure of each section ready for connection where said surface is larger than the transverse surface of the structure, positioning the wind turbine blade sections in relation to each other with elevation means such as actuators, connecting the wind turbine blade sections at said at least one connection surface by using connection means, where at least one environmental value of the connection area is controlled during the assembling.

BRIEF DESCRIPTION OF THE FIGURES

The invention will be described in the following with reference to the figures in which.

DETAILED DESCRIPTION

Figure 1:
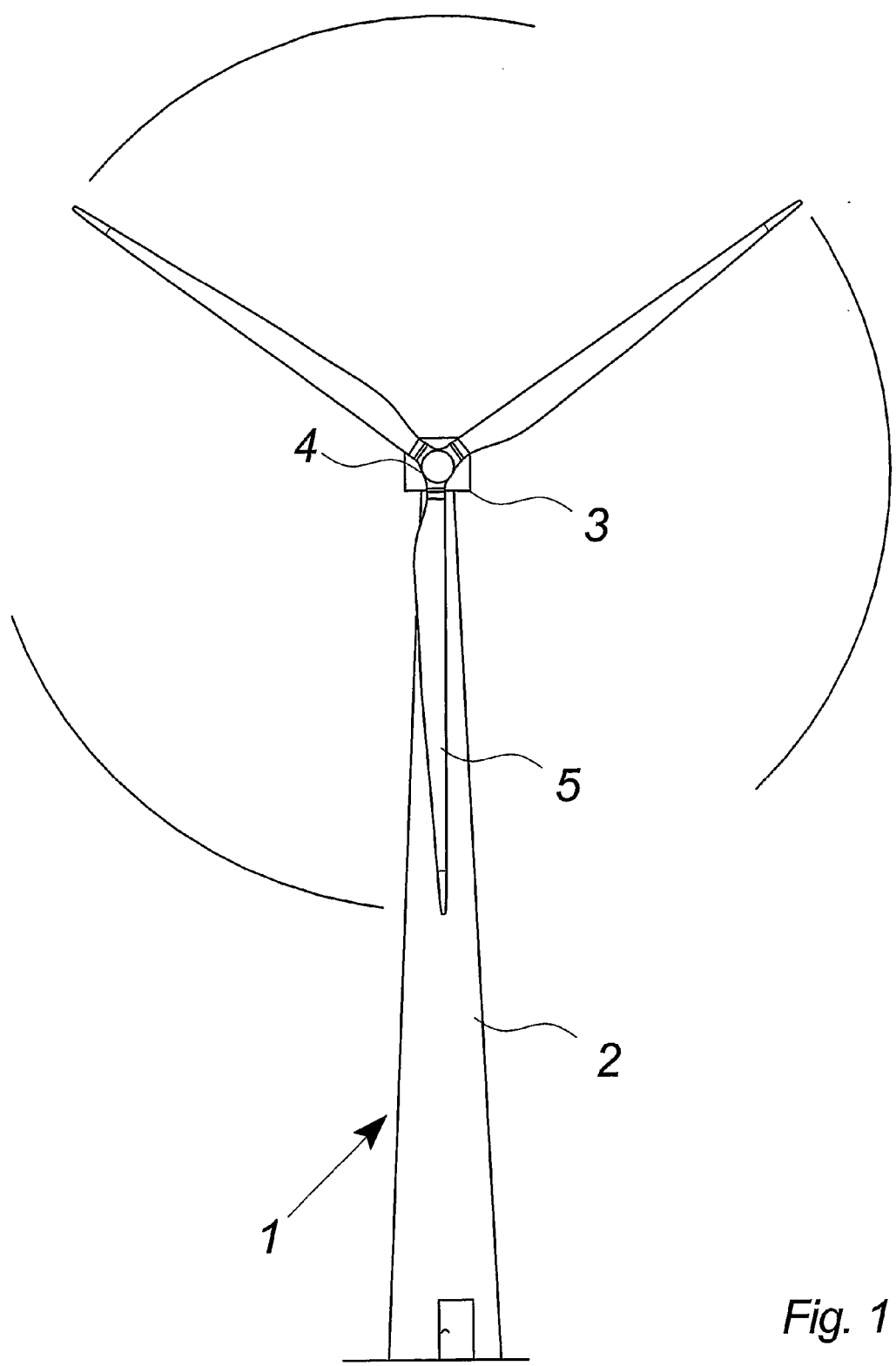
FIG. 1 illustrates a large modern wind turbine.

FIG. 1 illustrates a modern wind turbine 1 with a tower 2 and a wind turbine nacelle 3 positioned on top of the tower. The blades 5 of the wind turbine rotor are connected to the nacelle through the low speed shaft which extends out of the nacelle front.

As illustrated in the figure, wind over a certain level will activate the rotor and allow it to rotate in a perpendicular direction to the wind. The rotation movement is converted to electric power which usually is supplied to the transmission grid as will be known by skilled persons within the area.

Figure 2:
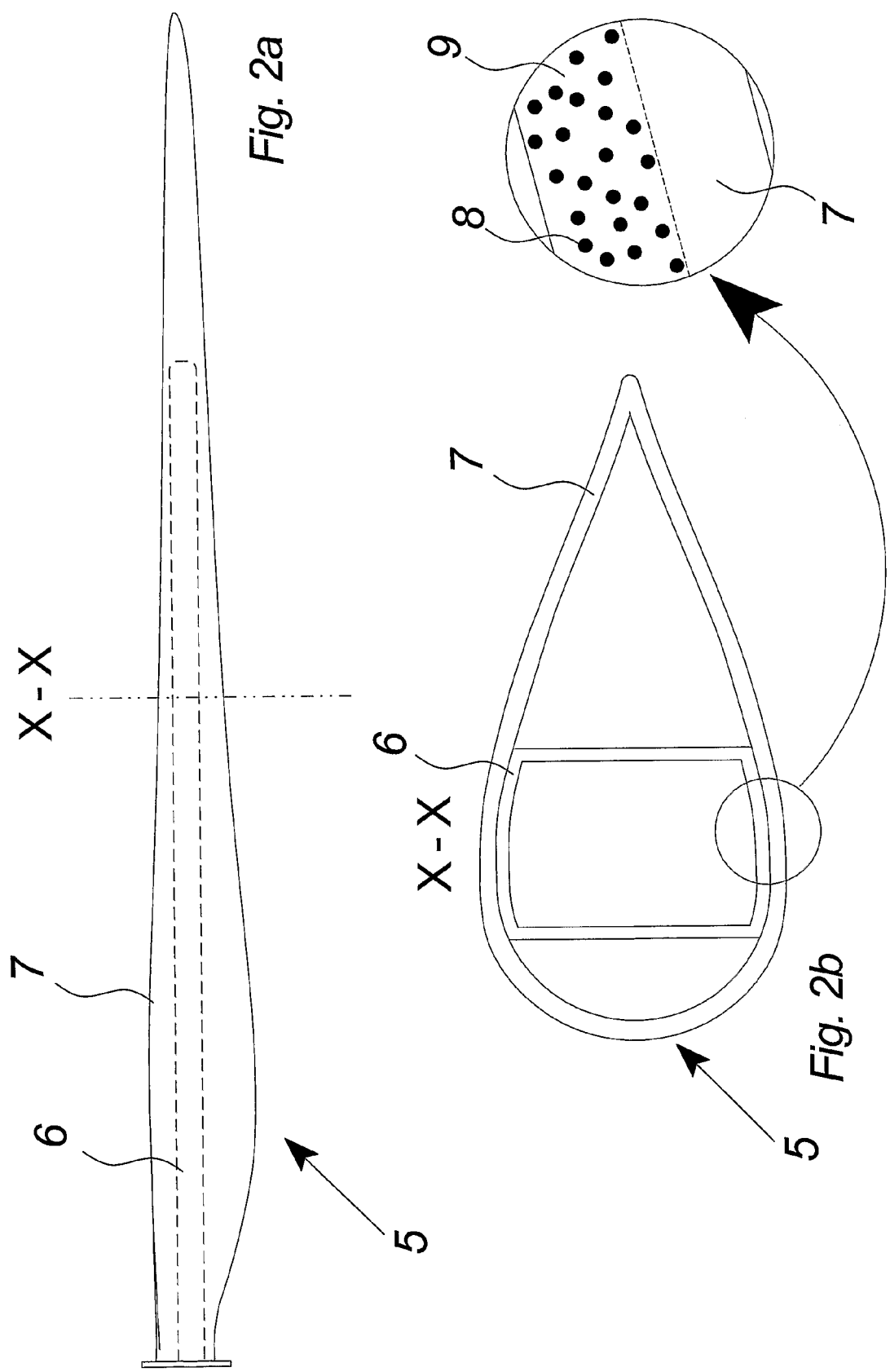
FIGS. 2a and 2b illustrate a wind turbine blade including an internal beam structure and an enlarged cross sectional view of the blade showing embedded carbon fibers.

FIGS. 2a and 2b illustrate a wind turbine blade with an internal strengthening structure 6 and an enlarged cross sectional view of the blade.

FIG. 2a illustrates schematically how the internal strengthening structure 6 includes an internal beam structure which is directed from the root of the wind turbine blade 5 toward the tip of the blade. The beam structure is connected directly to the root flange in which the flange establishes the further connection from the blade to the hub and the rest of the wind turbine 1. The beam structure gives strength to the wind turbine blade; stretches the surface shell structure 7 of the wind turbine blade and transfers the surface forces to the rest of the wind turbine.

FIG. 2b illustrates a cross sectional view of the wind turbine blade and the internal beam structure of FIG. 2a in which the beam structure comprises a substantially four-sided shape.

The figure further illustrates schematically that the structure of the embodiment is made in a standard glass fiber material 9 being reinforced with carbon fibers 8. The carbon fibers are illustrated as a number of single fibers embedded into the glass fiber material e.g. woven into the glass fiber layers or positioned alongside the layers before applying resin material. The carbon fibers are positioned and extend unbroken in the glass fiber material from end to end of the internal beam structure in order to create a light and high strength wind turbine blade.

The internal strengthening structure 6 may include further strengthening structures e.g. at the trailing (illustrated schematically in FIG. 4a) or leading edges in which the separate structures may be embedded in the surface material e.g. as a plate or a similar shaped means at each edge side. Even further internal strengthening structures may be established inside the wind turbine blade if necessary e.g. one or more pultruded carbon and/or glass fiber plates or bars positioned on the inside of the blade surface.

It shall be emphasized that the internal strengthening structure may comprise a number of different shapes besides the illustrated four-sided shape such as one or more I beams, U shaped beams or honeycomb structures. Further, the internal strengthening structure may comprise combinations of two or more of the different shapes. The different possibilities in shapes of the internal strengthening structure will be well known to the skilled person within the art.

Figure 3:
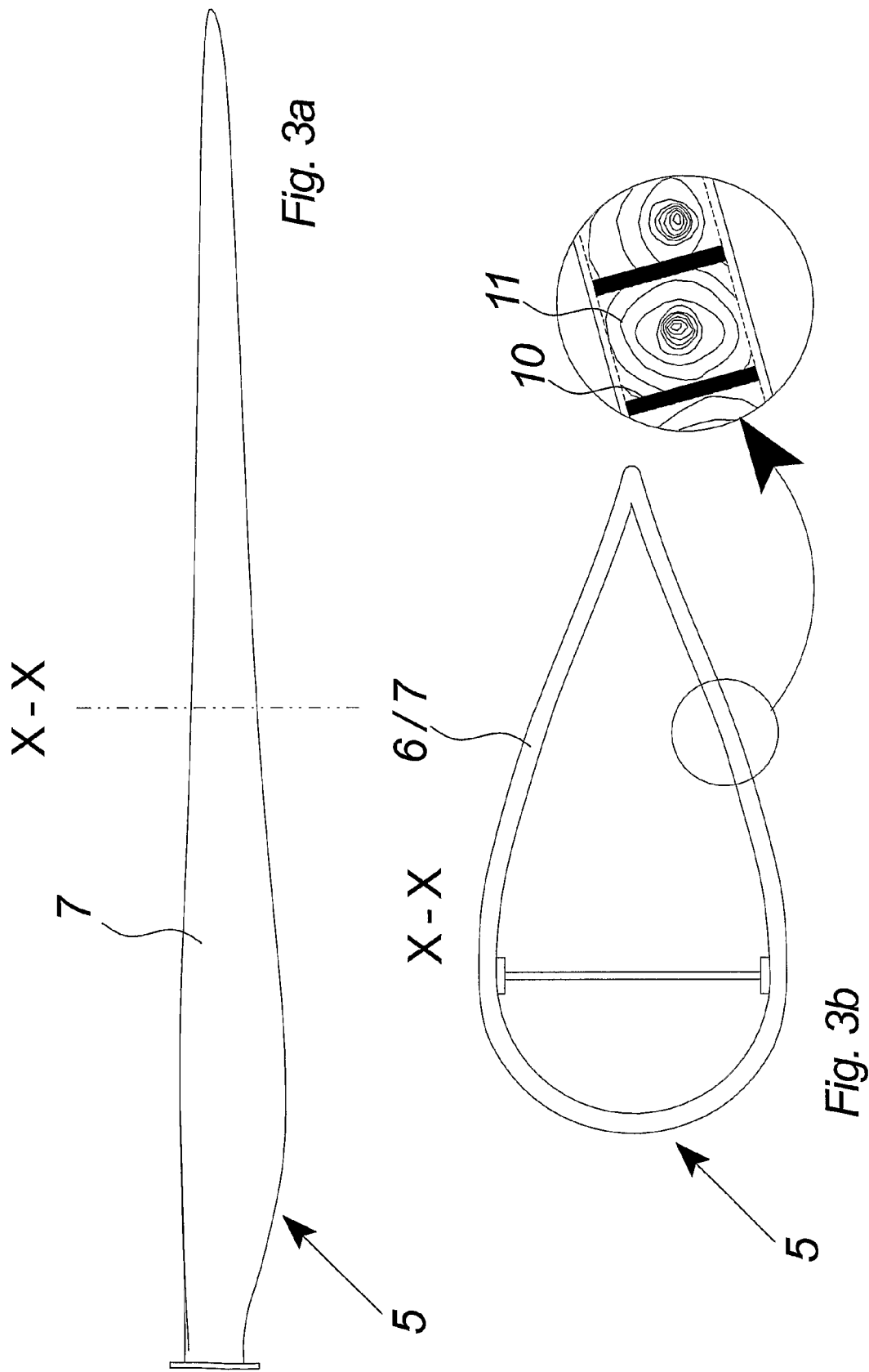
FIGS. 3a and 3b illustrate a wind turbine blade made in strips of different material and an enlarged cross sectional view of the blade showing the position of strips.

FIGS. 3a and 3b illustrate a further embodiment of a wind turbine blade and an enlarged cross sectional view of the blade.

FIG. 3a illustrates the wind turbine blade 5 including the surface shell structure 7 but without an internal beam structure as such.

FIG. 3b including the enlarged cross sectional view further illustrates the internal structure of the surface shell structure 7. The internal structure establishes the necessary internal strengthening structure 6 of the wind turbine blade 5. The view especially illustrates how a number of strips, made in different materials and positioned alongside each other, establish a wind turbine blade. The optimal strip material properties may be obtained by combining different types of strips, such as unbroken strips of carbon fibres 10 and wooden or glass fiber strips 11. The strips are jointed by suitable methods, e.g. by injection of resin or by vacuum infusion of resin between the strips.

The surface shell structure including the strips may also be combined with one or more pultruded carbon and/or glass fiber plates or bars positioned on the inside of the blade surface.

Consequently, the different types of strips and the resin form the surface 7 of the wind turbine blade 5. The strips and the resin establish at the same time an internal strengthening structure that is comparable in strength with the internal strengthening structure of the wind turbine blade illustrated in FIGS. 2a and 2b.

Further, it shall be emphasised that the internal beam structure of a wind turbine blade as illustrated in FIGS. 2a and 2b may also be manufactured with the use of strips e.g. instead of using embedded carbon fibers or instead of using glass fiber material alone.

Finally, the wind turbine blades may be manufactured with a combination of strengthening structures such as an internal beam structure and an internal strengthening structure in the surface shell structure. However, the I-beam of FIG. 3b illustrates a supporting (non-strengthening) structure that controls movements of the surface shell structure.

FIGS. 2a to 3b illustrate a normal profile of a wind turbine blade as it will be known by the skilled person e.g. the course and shape of the internal beam and/or the blade surface from root to tip. Further, the figures illustrate the two standard types of internal strengthening structure in a wind turbine blade i.e. a structure inside the interior defined by the blade surface or a structure inside the blade surface.

Figure 4:
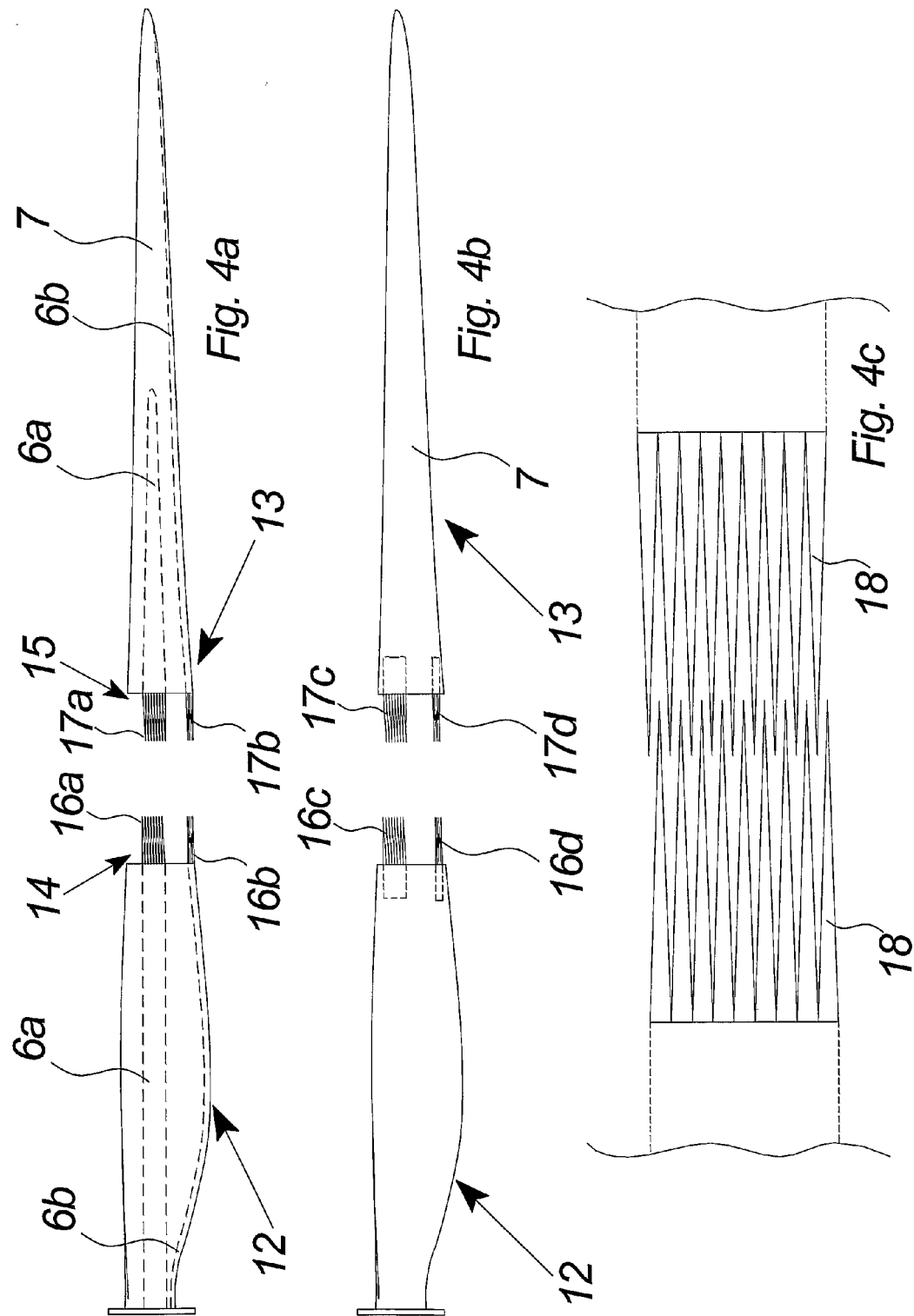
FIGS. 4a to 4c illustrate a wind turbine blade as two blade sections with corresponding dentated beam ends wherein the blade may be one of the illustrated in FIGS. 2a to 3b.

FIGS. 4a to 4c illustrate the wind turbine blades of FIG. 2a or 3a as two separate blade sections with corresponding dentated beam ends according to the present invention.

FIG. 4a illustrates how the wind turbine blade of FIG. 2a has been manufactured as two blade sections 12, 13 of a similar length or size. The sections comprise two internal beam ends 14, 15 that project out beyond the surface shell structure 7 of the blade sections. The beam ends 14, 15 are worked to form dentated beam ends 16a, 17a of a particular shape such as a number of triangular teeth or finger joints.

The figure also illustrates that the dentated beam ends 16a, 17a are supplemented with another set of dentated beam ends 16b, 17b projecting from the inner of the blade in proximity of the trailing edge. The latter set is illustrated with a fewer number of teeth than the first dentated beam ends 16a, 17a but otherwise similar in construction and shape.

The figure further illustrates that the two sections 12, 13 with the internal beam ends 14, 15 face each other and correspond in such a way that they may be seamlessly introduced into each other. By introducing the sections into each other is established a complete wind turbine blade 5.

The beam ends are preferably worked after the surface shell structure 7 of the blade sections has been positioned and fastened around the beam. The work process may include a high pressure water cutting machine/robot that cuts the teeth or fingers in the beam ends projecting out beyond the surface of the blade sections. The machine/robot may in one embodiment cut the teeth or fingers from above and down and thus creates vertically and/or horizontal orientated teeth or fingers when the wind turbine blade is positioned with side surfaces facing up/down and/or side/side. In this position the beam ends may be introduced into each other and subsequently only move in an up/down direction until the sections are rigidly fastened e.g. by adhering the surfaces of the teeth or fingers to each other.

FIG. 4b illustrates how a wind turbine blade without an internal beam structure e.g. of FIG. 3a manufactured as two sections 12, 13 of a similar length or size. Each section comprises a dentated beam end 16c, 17c positioned and projecting out from the end of the section. As illustrated in the figure with dotted lines the dentated beam ends are only extended a limited distance into the inner of the wind turbine blade sections 12, 13 as sorts of short sections of an internal beam structure inside the internal strengthening structure of the surface shell structure 7. The dentated beam ends 16c, 17c substantially correspond in shape and are connected to the inner surfaces of the wind turbine blade e.g. by use of adhering means.

The figure also illustrates that the dentated beam ends 16c, 17c are supplemented with another set of dentated beam ends 16d, 17d projecting from the inner of the blade in proximity of the trailing edge. The latter set is illustrated with a fewer number of teeth than the first dentated beam ends 16c, 17c but otherwise similar in construction and shape.

The figure further illustrates that the two sections 12, 13 with the two sets of dentated beam ends 16c, 17c, 16d, 17d face each other and correspond in such a way that they may be seamlessly introduced into each other.

The two sections of the wind turbine blade may be manufactured by using four blade shell halves in which the pre-manufactured sets of dentated beam ends 16c, 17c, 16d, 17d are positioned on the inner surface of two shell halves before the two other shell halves are positioned above and fastened to the first two shell halves. The pre-manufactured set of dentated beam ends may also be established as four identical end halves in which each halves is fastened to a shell halves and consequently meet when the shell halves are fastened to each other.

By using and positioning pre-manufactured set of dentated beam ends in the surface shell structure 7 it is possible to extend the teeth into the hollow space of the wind turbine blade.

Further, the projecting ends may be worked after the shells of the blade sections have been fastened to each other as further explained above.

FIG. 4b may also (slightly modified) be seen as the connection between two ends of a surface shell structure 7 such as illustrated in FIGS. 3a and 3b in which the dentated teeth are established in the surface shell structure e.g. in all of the corresponding surfaces or in parts of the surfaces at the connection.

FIG. 4c illustrates an internal strengthening structure with two corresponding dentated ends comprising a number of teeths e.g. two ends of an in internal beam (such as illustrated in FIGS. 4a and 4b) or two ends of a surface shell structure (such as illustrated in FIGS. 3a and 3b).

Figure 5:
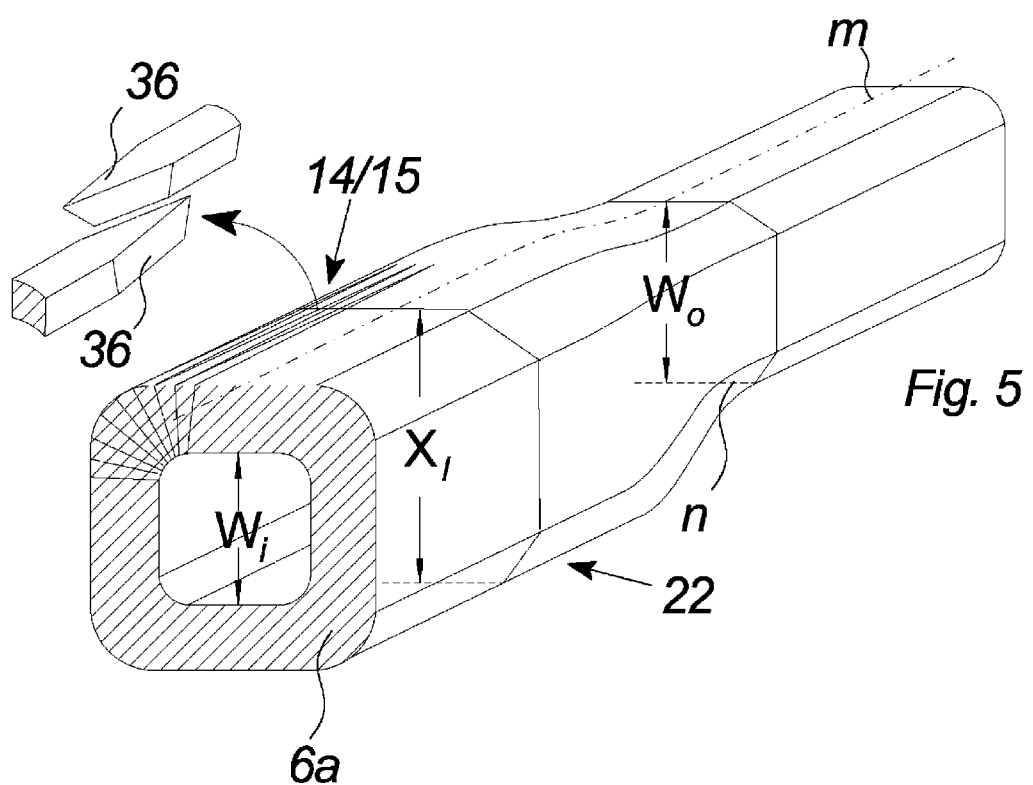
FIG. 5 illustrates a cross sectional and perspective view through an internal beam of a wind turbine at a joint between blade sections.

FIG. 5 illustrates a cross sectional and perspective view through a preferred embodiment of an internal beam 6a of a wind turbine blade. The view is established in proximity of an enlarged connection joint 22 between two sections of a wind turbine blade without the blade surface illustrated. The two sections are connected at corresponding dentated beam ends 14, 15 with the use of a number of teeth entered into each other in a seamless connection. The surface of the teeth comprises adhesive means and the connection joint is enlarged in order to create a connection joint with an even larger connection surface than without the enlargement.

The perspective view illustrates the relationship between the normal outer length or thickness $W_o$ of the strengthening structure 6a and the enlarged length or thickness $X_l$ in which both values are measured on the same longitudinal measuring line m. The line m may be defined by the peak values of the enlarged length or thickness $X_l$ at the connection joint and the normal outer length or thickness $W_o$. The $W_o$ value is measured next to the start of the enlargement at the course of the normal wind turbine blade e.g. less than a meter from the connection of the connection joint 22 in direction of the root of the wind turbine blade at a transverse line n. The line n illustrates the separation between the course of the normal wind turbine blade and the enlargement i.e. a transverse line on opposite side of the enlargement indicating the beginning and end of the enlargement. Further, the figure illustrates the normal inner length or thickness $W_i$ of the strengthening structure 6a e.g. at the line n.

Figure 6A:
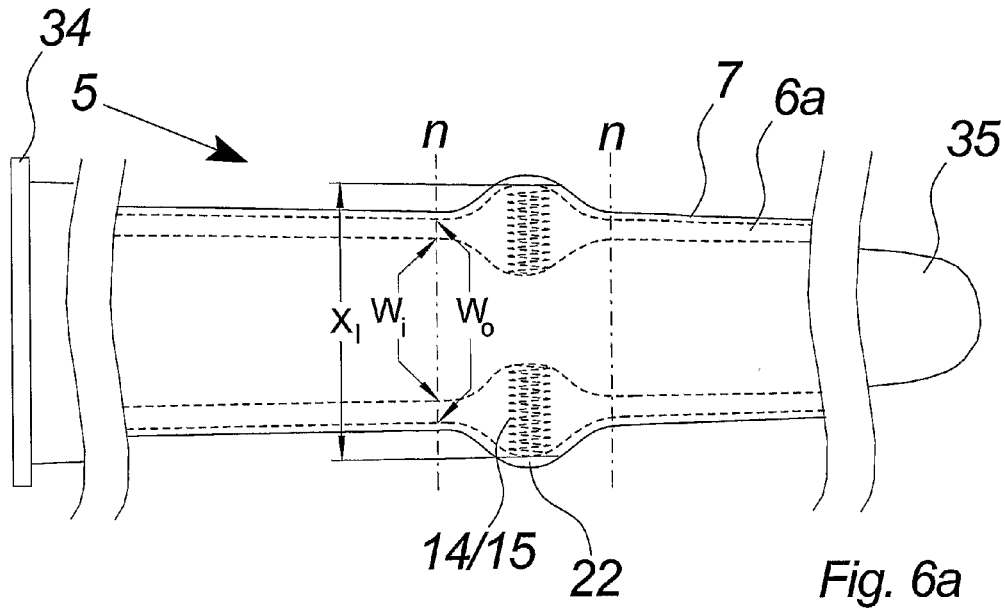
FIG. 6a illustrates a cross sectional view through sections of a wind turbine including an internal strengthening beam seen from a blade edge.

The view further illustrates how the enlarged connection joint 22 expands in horizontal (toward the blade edges—further illustrated in FIGS. 6b and 6c) as well as vertical directions (toward the blade surface—and the center as further illustrated in FIG. 6a). However, the enlarged connection joint 22 may also expand in just one direction e.g. in the horizontal direction toward the blade surfaces and/or toward the center of the blade.

FIG. 5 finally illustrates two corresponding teeth shown with a wedge shape as a part of a corner in the beam structure in which the wedge shape may be seen as an alternative to sharp or rounded teeth of the ends (as illustrated with the pie shaped pieces (36) next to each other in the one upper corner of the beam).

FIG. 6a further illustrates the principle of FIG. 5 in which the sections of an internal beam 6a in a wind turbine are connected in an enlarged connection joint 22. The enlargement is illustrated in the vertical direction between the lines n and seen from the edge of the wind turbine blade toward the side of the strengthening structure 6a. The enlargement is further illustrated as growing symmetrically in relation to the normal course of the blade in the area between the two lines n i.e. the enlargement expands symmetrically into the interior of the blade as well as outwardly.

The internal beam 6a of the internal strengthening structure is covered with a surface shell structure 7 and hereby is created a preferred embodiment of a wind turbine blade according to the invention. The wind turbine blade will appear with the surface of a normal blade but with a transverse enlargement or a border across the blade surface e.g. from edge to edge at the connection joint.

The enlargement of the beam creates a number of different sizes such as:

$X_l$ the length of the transverse surface of the enlarged connection joint 22 in the strengthening structure (e.g. the beam of FIGS. 2a and 2b or the surface shell structure 7 of FIGS. 3a and 3b) in relation to the length $W_o$ of the general transverse surface of the strengthening structure in proximity of $X_l$. The lengths are measured at the peak of the enlargement e.g. at the highest point of the blade in the connection joint in which the highest point usually will be at the center of the connection joint. The length $W_o$ is measured just before the enlargement starts e.g. at the line n in direction of the root 34 of the wind turbine blade. The width of the blade is substantially the same at the positions for $W_o$ and $X_l$ and thus the relation between the surface areas are reflected in the relation between $X_l$ and $W_o$ ($X_l$ being significantly larger in connection with the enlarged connection joint 22). The surface lengths $W_o$ and $X_l$ may be seen as relevant surface values if the structure was transversely cut over in a cut establishing the smallest possible cut surface at the connection joint 22.

$W_o$ the outer distance of the strengthening structure at the adjacent normal course of the wind turbine blade in relation to the enlargement.

$W_i$ the inner distance of the strengthening structure. The inner distance may continue the normal course through the enlargement or be diminished in order to create even further surface area for the connection. The distances are measured longitudinally on a line meeting the peak of the enlargement e.g. at the highest point of the blade in the connection joint.

Figure 6B:
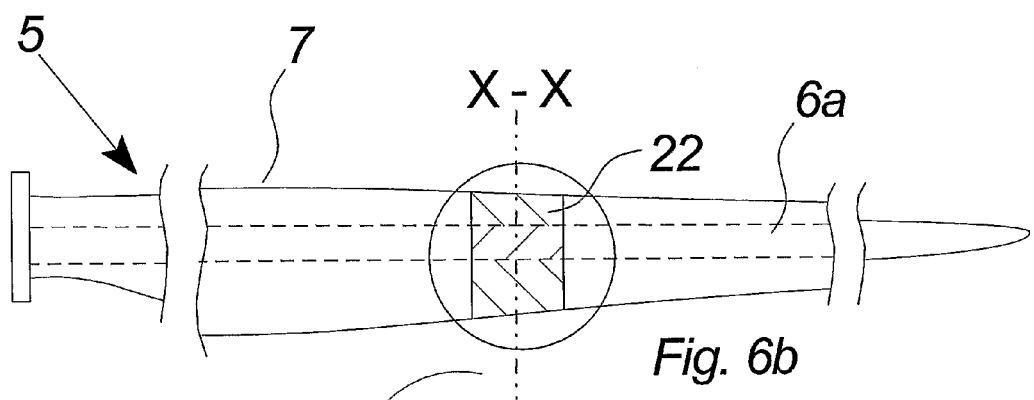
FIG. 6b illustrates a view of sections of a wind turbine including an internal beam according to the invention seen from above the surface of the blade.

FIG. 6b illustrates sections of a wind turbine blade 5 according to the invention. The blade including an internal strengthening structure 6a is seen from above the surface of the blade.

The enlargement 22 is illustrated as a first enlargement 22a above the strengthening structure 6a and second enlargements 22b continuing from the first enlargement 22a to the front and trailing edges of the blade 7. The second enlargements may have the same height of the first enlargement or be reduced toward the edges of the blade (as very schematically illustrated in the X-X view of FIG. 6c) and thus form a continuous border from edge to edge. The first enlargement 22a may also be the only enlargement and thus be a sort of island raised on the central part of the surface 7 at a part of the blade 5.

Figure 6C:
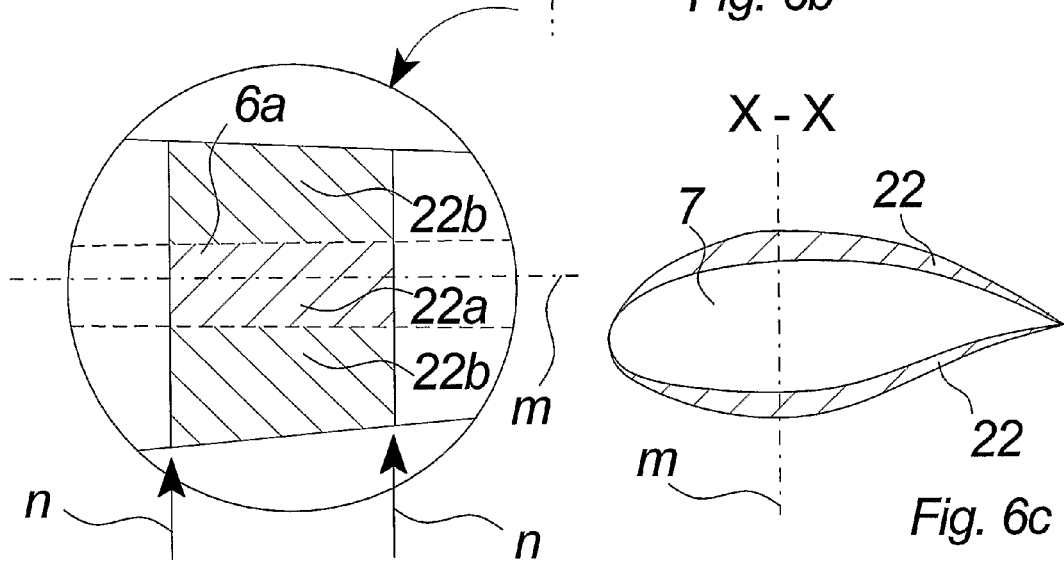
FIG. 6c illustrates schematically a wind turbine blade including enlargement seen from the blade tip.

FIG. 6c illustrates schematically a wind turbine blade including an enlargement seen from the blade tip. As seen the enlargement forms a continuous border from edge to edge in which a cover of the enlargement may be used in order to improve the aerodynamic profile for the blade at the enlarged joint connection 22 (as further illustrated in FIGS. 11b and 11c).

FIGS. 6b and 6c also illustrate the course of the lines m and n seen from the different positions.

Figure 7A:
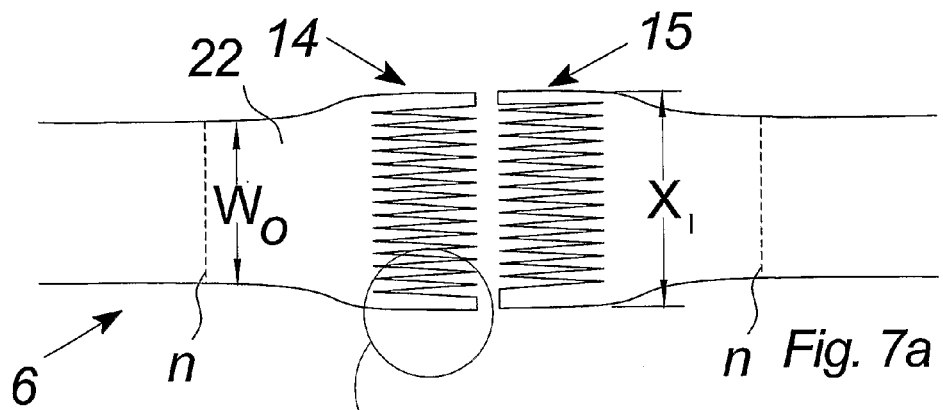
FIGS. 7a and 7b illustrate the sizes of dentated beam ends in the joint of the blade sections and the sizes of a set of teeth.
Figure 7B:
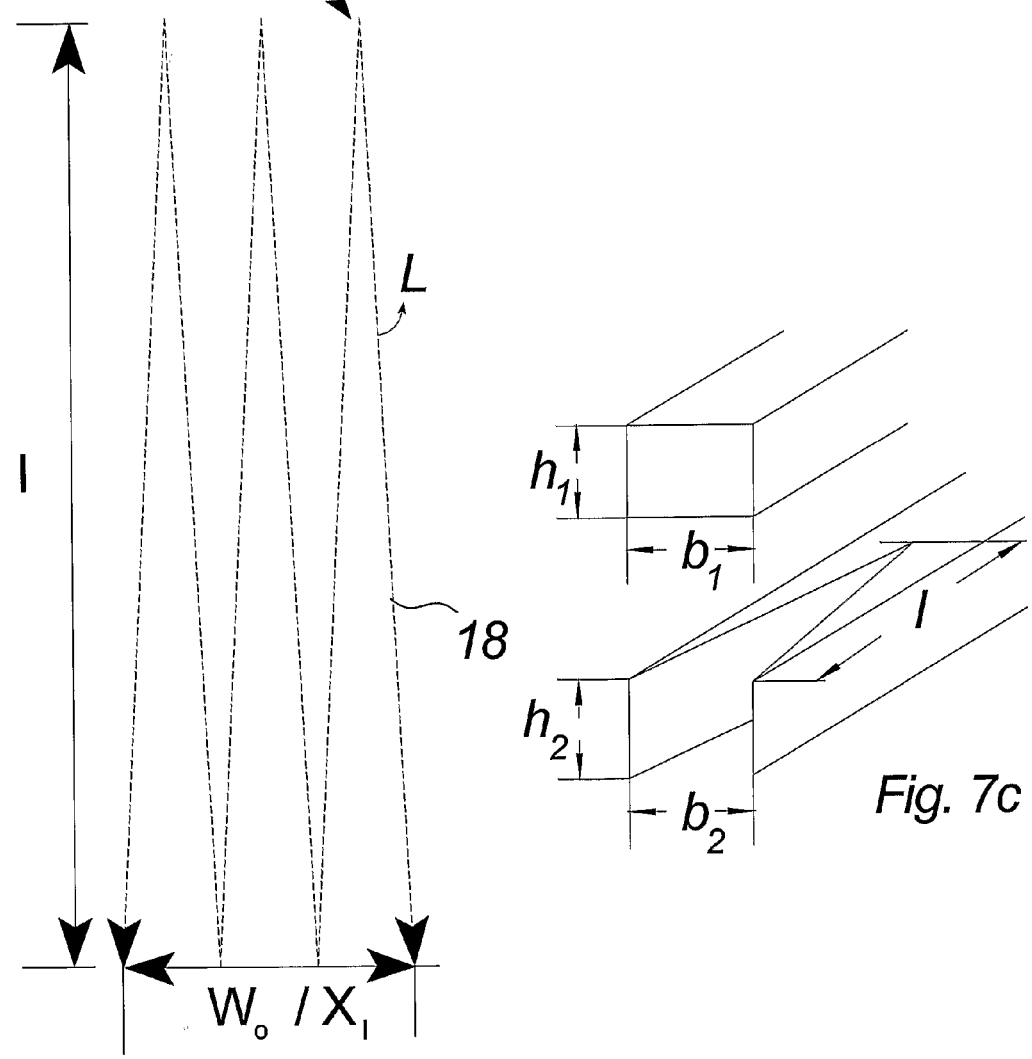

FIGS. 7a and 7b illustrate in more details the sizes of an internal strengthening structure 6 such as dentated beam ends and teeth of the connection joint in a wind turbine blade. The many teeth have a connection surface with a total length L which is significantly longer than the length of the transverse surface (the length $W_o$ or $X_l$) of the internal strengthening structure. The upper or lower teeth are illustrated as thicker than the other teeth in order to indicate the possible forms at the four corners (as further illustrated in FIG. 5).

Further, FIG. 7a illustrates another embodiment in which the enlarged connection joint 22 is established with two teeth units connected to the normal strengthening structure 6 (the connections established at the dotted lines n). The units are fixed to the ends of the normal strengthening structure as units for supplementary mounting at or just after the manufacturing process at the manufacturing plant e.g. by using long surfaces and adhering means as described above and below.

Figure 7C:
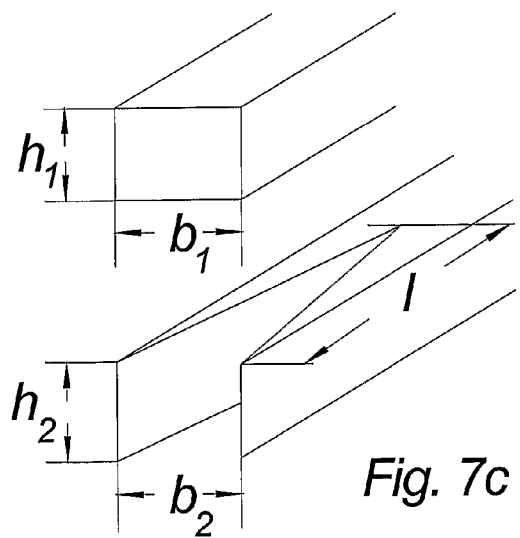
FIG. 7c illustrates the sizes and relationship between a normal cut and a dentated beam end.

FIG. 7c illustrates the relationship between an end of a beam and an example of a dentated beam end to be bonded in a connection joint. The two ends are illustrated with the same width $b_1$, $b_2$. The heights $h_1$, $h_2$ of the ends may be the same or for example $h_2$ larger than $h_1$ and thus create an enlargement at the joint. The height $h_2$ may for example be at least 2 times as large as the normal height $h_1$ for the wind turbine blade such as 3 times as large.

The bonded joint is carbon fibre bonded with epoxy in which the tensile strength of carbon is $\sigma$ carbon ~1000 MPa. The strength of a carbon section can be expressed as $\Gamma_{carbon} \cdot h_1 \cdot b$.

The shear strength of an epoxy adhesive is $\tau_{epoxy}$~10 MPa. The strength of the bonded section can be expressed as $\tau_{epoxy} \cdot h_2 \cdot 2l$.

1. If the strength of the carbon strips ≦ the strength of the joint (for $b=b_1=b_2$):

$$\sigma_{carbon} \cdot h_1 \leq \tau_{epoxy} \cdot h_2 \cdot 2l$$

$$\ell \geq \frac{\sigma_{carbon} \cdot h_1}{\tau_{epoxy} \cdot h_2 \cdot 2} = \frac{1000 \cdot h_1}{10 \cdot h_2 \cdot 2} = 50 \frac{h_1}{h_2}$$

i.e. $h_1=h_2 \Rightarrow l \geq 50b$, $b=10$ mm then
the tooth length $l=l=50 \cdot 10=500$ mm (very slender tooth)

2. If $h_2 > h_1 \Rightarrow l < 50 \cdot b$ (for $b=b_1=b_2$):
e.g. $h_2=3 \cdot h_1$ and $b=10$ mm then $$\text{the tooth length } 1 = \ell \geq \frac{50 \cdot 10}{3} = 167 \text{ mm (a more preferable size)}.$$

3. If $h_2 \gg h_1 \Rightarrow l < 50 \cdot b$ (for $b = b_1 = b_2$):
e.g. $h_2 = 6 \cdot h_1$ and $b = 10$ mm then $$\text{the tooth length } 1 = \ell \geq \frac{50 \cdot 10}{6} = 83 \text{ mm (a preferable size)}.$$

As stated, the number of teeth is preferably circa 100 per meter (b per tooth=10 millimeters) of the joint connection e.g. the normal connection ($h_2 = h_1$) or the enlarged connection ($h_2 > h_1$). However, the number of teeth may be chosen freely between 25 and 200 per meter e.g. by changing the relation between the heights in order to achieve a preferred length of the teeth.

Figure 8A:
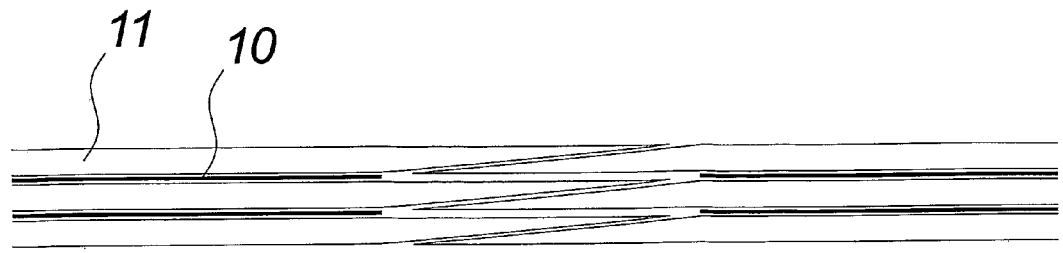
FIGS. 8a to 8c illustrate different embodiment of the corresponding dentated beam ends or surface shell structures in an internal strengthening structure of a wind turbine blade.
Figure 8B:
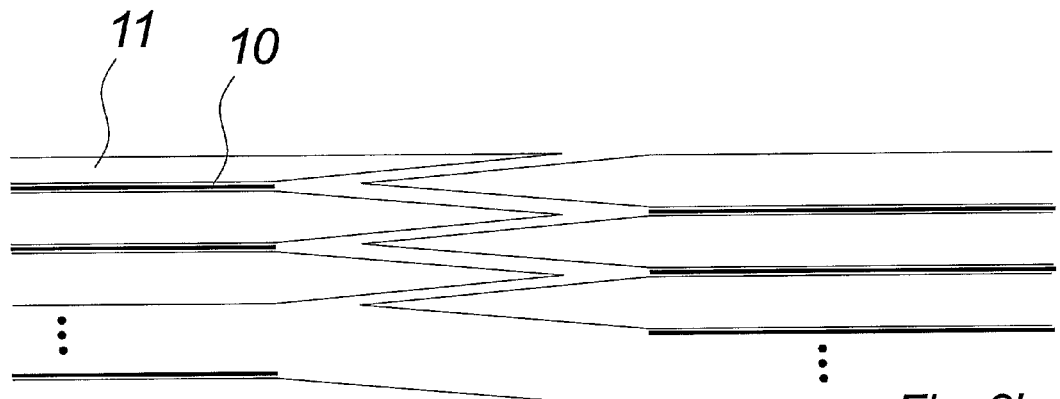
Figure 8C:
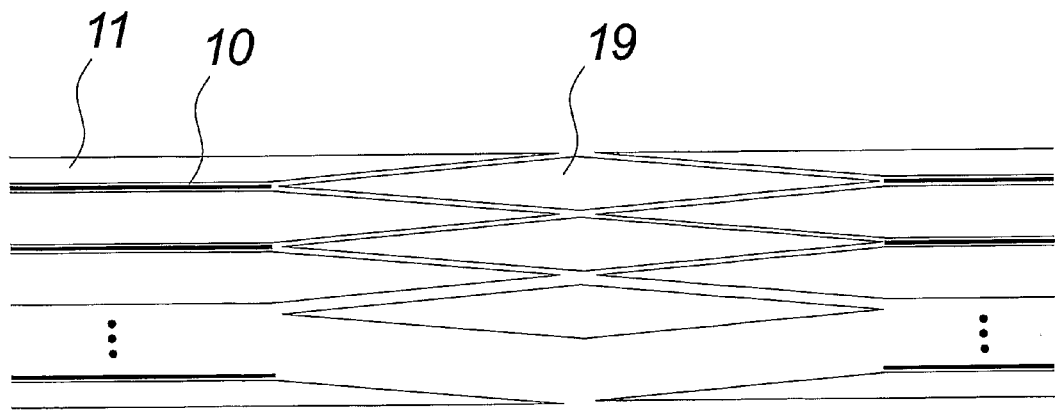

FIGS. 8a to 8c illustrate different embodiment of the corresponding dentated beam ends or surface shell structure ends in an internal strengthening structure of a wind turbine blade (e.g. a blade of FIG. 2a, 2b or 3a, 3b). The embodiments all illustrates the connection of two wind turbine blade sections in which each section comprises sets of unbroken wood or glass fiber 11 and carbon strips 10. The strips of wood or glass fiber 11 are connected in the connection joint by using different embodiments of long surfaces and adhering means e.g. in a normal sized or an enlarged connection joint.

FIG. 8a illustrates the connections between at least three sets of wood or glass fiber strips 11. The connections are established by corresponding strip ends shaped as right-angled triangles each forming a rectangular connection of a similar thickness as the rest of the strip. The strips of carbon 10 end freely with no corresponding connection surfaces.

FIG. 8b also illustrates the connections between at least three sets of wood or glass fiber strips 11. The strips come in two shapes: Right-angled and equilateral triangles in which the different strip types together form a rectangular connection between the strips. The strips of carbon 10 end freely with no corresponding connection surfaces.

FIG. 8c illustrates the connections of FIG. 8b in which the connections between at least three sets of wood or glass fiber strips 11 are established with the use of intermediate connection means 19. The intermediate connection means 19 are diamond shaped and close the cavities between the strips with the same surface area but less teeth length in relation to the previous figure. The strips of carbon 10 end freely with no corresponding connection surfaces.

Figures 9A, 9B, 9C:
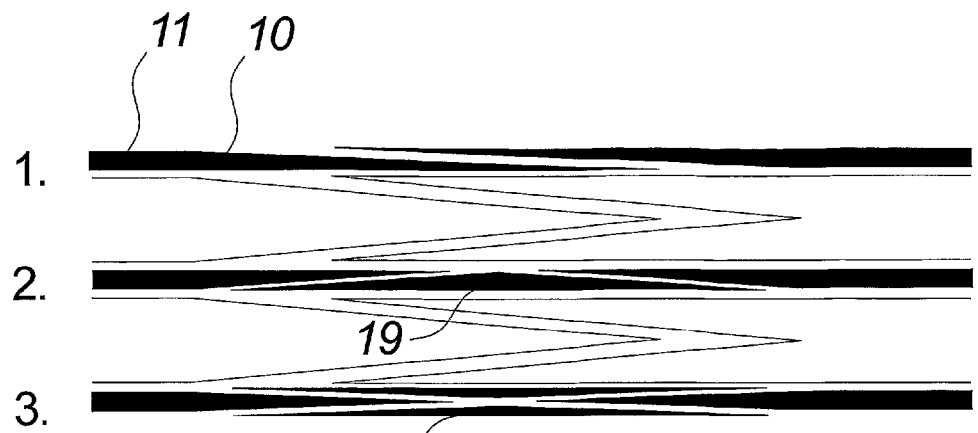
FIGS. 9a to 9c illustrate further embodiments of the corresponding dentated beam ends or surface shell structures in an internal strengthening structure of a wind turbine blade.

FIGS. 9a to 9c illustrate further embodiments of the corresponding dentated beam ends or surface shell structures in an internal strengthening structure of a wind turbine blade. The corresponding surfaces of the embodiments are adhered to each other by adhering means.

FIG. 9a illustrates the connection between two strips of wood or glass fiber 11 in which one strip ends in a triangular shape and the other in a corresponding fork shape.

The figure further illustrates three different embodiments of the connection between carbon strips wherein each connection is different in shape and last two involve the use of intermediate connection means 19.

The upper connection (1.) between two carbon strips is established by corresponding strip ends shaped as right-angled triangles forming a rectangular connection of a similar thickness as the other parts of the strips.

The center connection (2.) between two carbon strips is established by strip ends shaped as right-angled triangles meeting tip to tip. The cavity between them is closed with a triangular intermediate connection means 19 in which the triangles and the means establish corresponding surfaces to be used in the adhering and connection of the carbon strips. The connection comprises the same surface area as the previous figure (1.) but with lesser teeth length.

The lower connection (3.) between two carbon strips is established by strip ends shaped as triangles meeting tip to tip (anything but right-angled tips). The two cavities (on opposite side of the tips) are closed with two triangular intermediate connection means 19 in which the triangles and the means establish corresponding surfaces to be used in the adhering and connection of the carbon strips 10.

FIG. 9b illustrates the connection between two strips of wood or glass fiber 11 in which the two strip ends are in a similar shape. The shape comprises different triangles in which the degree of inclination is changed in a point of discontinuity whereby sections of the triangles meet and two cavities (on opposite side of the met sections) are closed with two triangular intermediate connection means 19 in which the triangles and the means establish corresponding surfaces to be used in the adhering and connection of the wood or glass fiber 11 strips.

FIG. 9c illustrates the connection between two strips of wood or glass fiber 11 in which one strip ends in a triangular shape and the other in a corresponding fork shape.

The connection between two carbon strips is established by strip ends in corresponding two- and three-pronged forks. The two forks form an enlarged connection in relation to the rest of the carbon strips. The size of the connection between the two strips of wood or glass fiber 11 is diminished in order to create the necessary space for continuous seamless connections between different typed strips.

It shall be emphasized that each dentated beam or surface shell structure end in an internal strengthening structure may be altered e.g. in length, position or number of teeth as long as the corresponding end or end and intermediate connection means also are altered. Further, the different embodiments of the ends and intermediate connection means may be used in connection with any type of strips e.g. wood, glass fiber or carbon fiber strips.

Figure 9D:
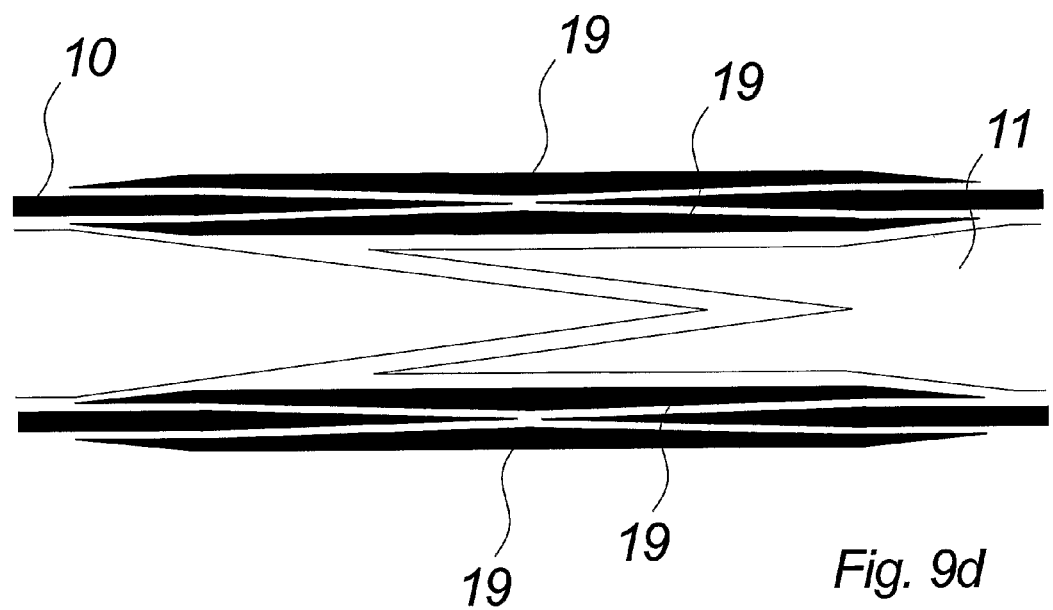
FIGS. 9d and 9e illustrate even further embodiments of the corresponding dentated beam ends or surface shell structures in an internal strengthening structure of a wind turbine blade.
Figure 9E:
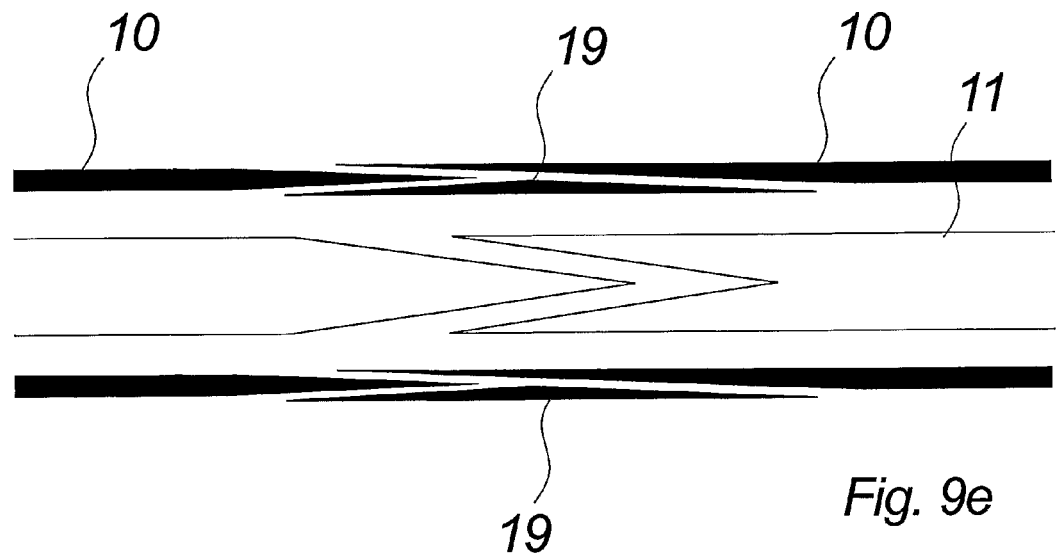

FIGS. 9d to 9e illustrate even further embodiments of the corresponding dentated beam ends or surface shell structures in an internal strengthening structure of a wind turbine blade.

FIG. 9d illustrates the connection between two strips of wood or glass fiber 11 in which one strip ends in a triangular shape and the other in a corresponding fork shape. The figure also illustrates the connection between two carbon strips 10 which is established by the strips meet end to end and two intermediate connection means 19 are lashed on opposite sides of the ends tying them together. The surfaces interconnecting the first and second strip, respectively, with the two intermediate connection means 19 correspond in size to the surface of the much longer connection between carbon strips ends of e.g. FIG. 9a.

The connection between the two strips of wood or glass fiber 11 is illustrated as diminished in relation to the normal length or thickness of the strips in order to meet the slightly enlarged carbon strip connection.

FIG. 9e illustrates the connection between two strips of wood or glass fiber 11 in which one strip ends in a triangular shape and the other in a corresponding fork shape. The figure also illustrates the connection between two carbon strips 10 which is established by strip ends meet and are connected by one intermediate connection means 19 lashed on one side of the carbon strips 10.

Figure 10A:
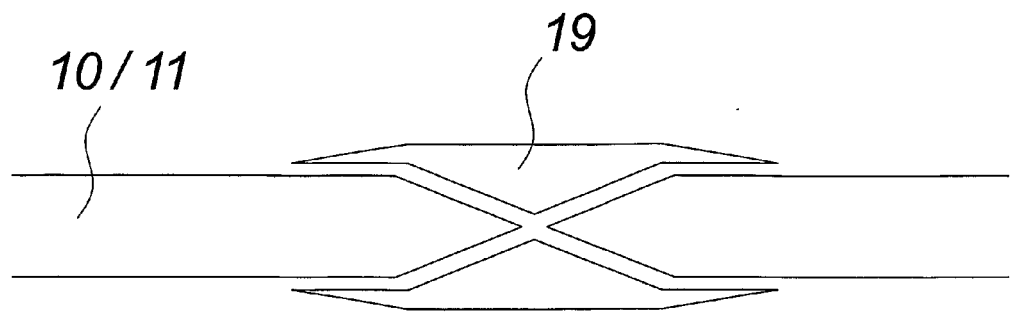
FIGS. 10a to 10c illustrate embodiments of the corresponding dentated beam ends or surface shell structures in an internal strengthening structure of a wind turbine blade.
Figure 10B:
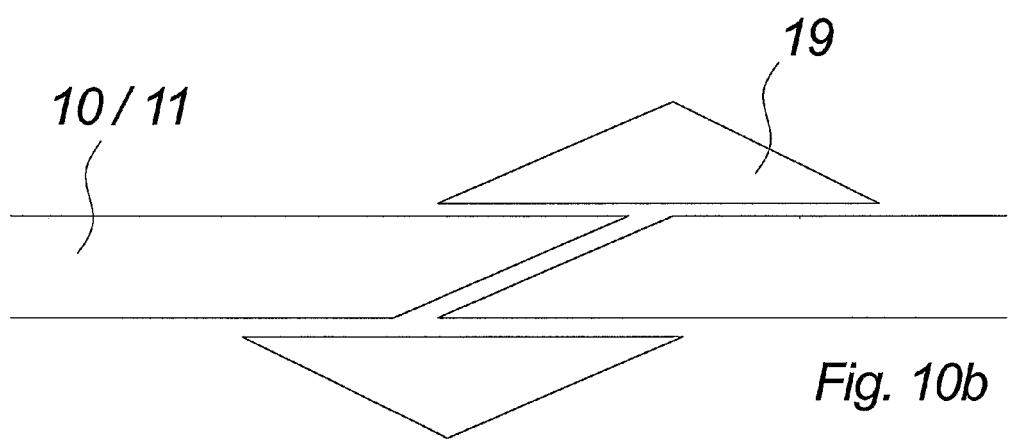
Figure 10C:
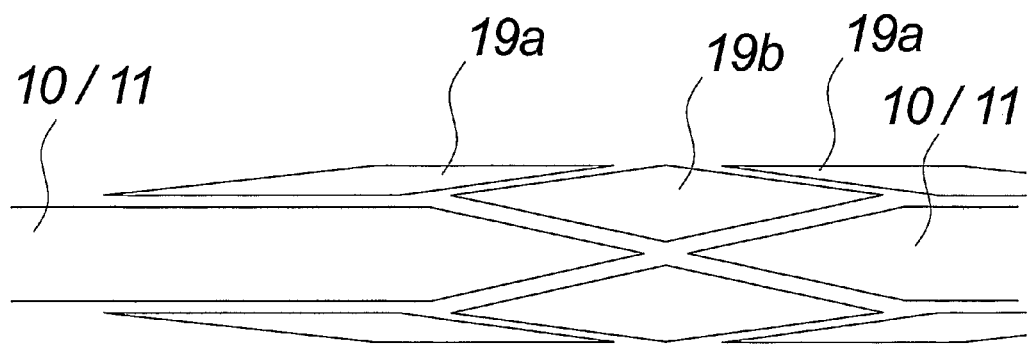

FIGS. 10a to 10c further illustrate some of the possible connections between strips such as carbon and wooden strips.

The connection of FIG. 10a corresponds largely to the connection between carbon strips in FIG. 9d with two intermediate connection means 19 corresponding to the shape of the strips ends as well as stretching to overlap some of the regular strip surface. The two intermediate connection means 19 are illustrated as rather freely shaped means corresponding to the end surfaces of the strips.

FIG. 10b illustrates the two intermediate connection means 19 as triangles positioned on the opposite side of the strips 10/11 and closing the connection between the two ends of the strips in which the ends correspond to each other.

FIG. 10c illustrates the intermediate connection means as two different sets of connection means 19a, 19b positioned one set after the next. The one set 19b is positioned between the strip ends and the other sets 19a on opposite sides of the one set 19b at the strips 10/11.

Figure 11A:
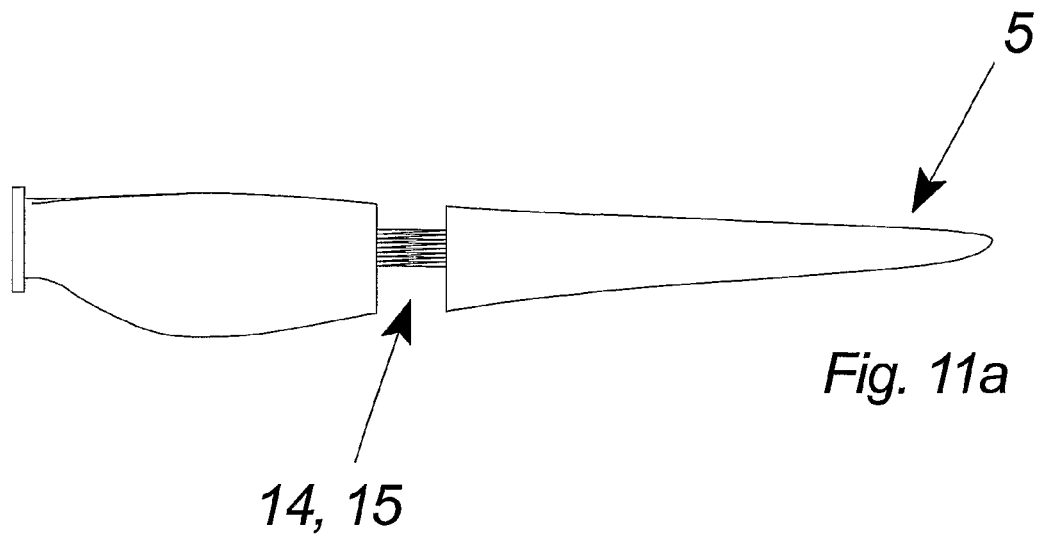
FIGS. 11a to 11c illustrate some steps in an assembly method for the sections of the wind turbine blade.
Figure 11B:
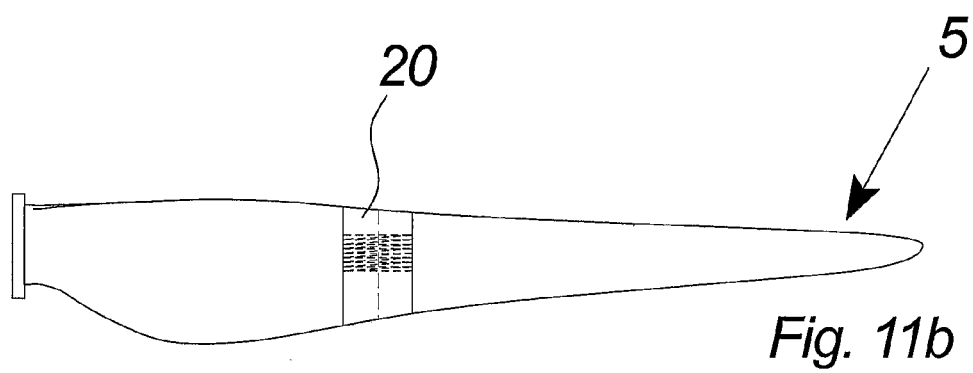
Figure 11C:
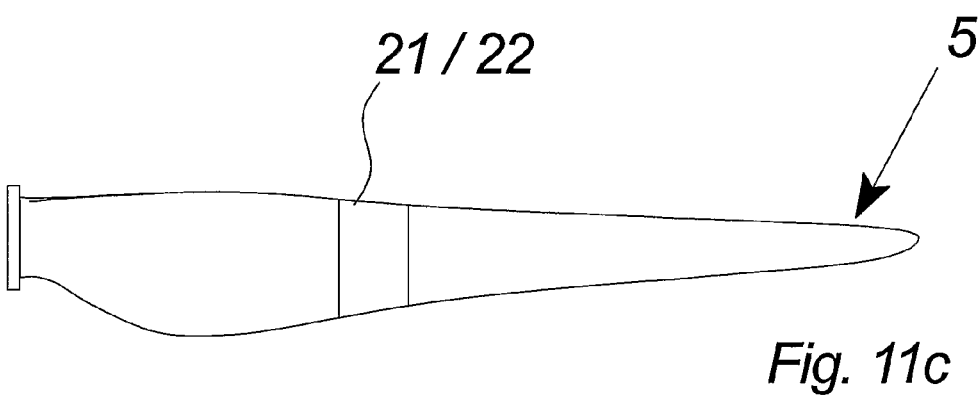

FIGS. 11a to 11c illustrate some steps in an assembly method for the sections of the wind turbine blade.

The transporting of the wind turbine blades from the manufacturing site to the place of erecting the wind turbine is performed as sections. The sections are transported by truck in which the transportation may be performed as a more standard transport due to the reduced length and weight of the load in comparison to the wind turbine blade in one piece.

Usually, the two sections of a wind turbine blade may be positioned side by side on one truck. However, the maximum load limits of standard trucks may be one of the parameters that determine the number of sections that a wind turbine blade is divided into and how many sections which are positioned on each truck. Each blade may for example be manufactured in three or more sections instead of two as described in the embodiments exemplify the present invention and each section may also be positioned on a separate truck. The sections may further be transported in one or more containers e.g. connected standard containers on train or sea transport.

FIG. 11a illustrates the sections of the wind turbine blade 5 as they arrive at the place of erecting the wind turbine. The sections are forced against each other in such a way that the dentated beam ends form a seamlessly connection. The connection includes adhesive means on the surfaces of the beam ends, creating a fixed connection joint 21 or enlarged connection joint 22 between the blade sections.

FIG. 11b illustrates the blade sections after adhesive means has hardened and the fixed joint connection thus has been established. The open distance between the sections above the connection joint 21/22 is closed tightly with a cover surface 20 e.g. a few layers of glass fiber. This cover also serves as a reestablishment of the aerodynamic profile for the blade at the connection joint.

FIG. 11c illustrates the wind turbine blade with the connection joint being ready for mounting on the wind turbine after the cover surface has been painted in order to blend in with the rest of the wind turbine blade.

Figure 12:
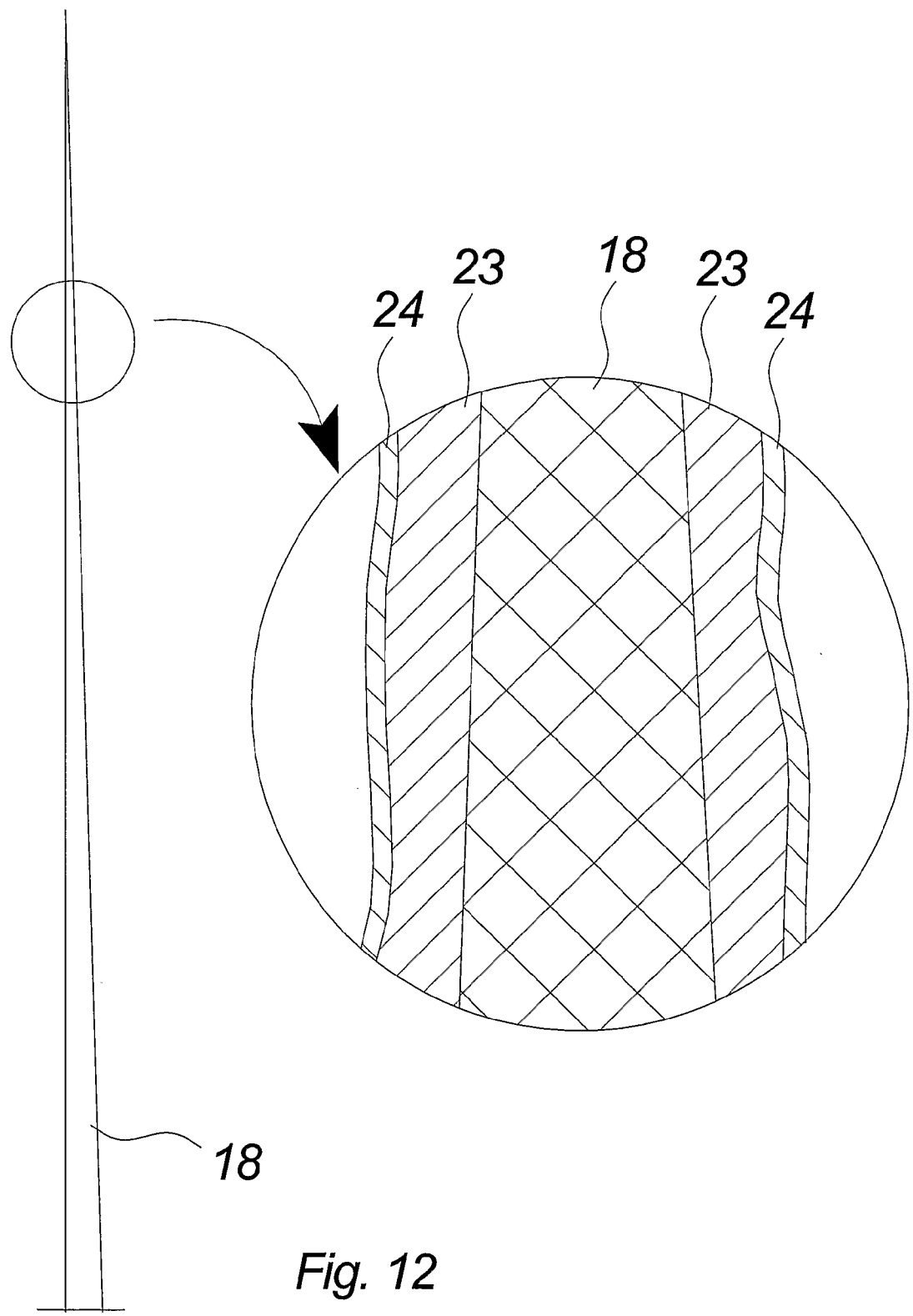
FIG. 12 illustrates a single tooth of the dentated beam ends or the surface shell structures in an internal strengthening structure of a wind turbine blade as well as an enlarged cross sectional view of the tooth.

FIG. 12 illustrates a single tooth 18 of the dentated beam ends or surface shell structures in an internal strengthening structure of a wind turbine blade as well as an enlarged cross sectional view of the tooth.

The shape of the tooth is illustrated as a substantially triangular shape but the teeth may comprise any form that ensures long corresponding surfaces at the connection joint between the sections of the wind turbine blade. The teeth of the connection joint may e.g. comprise rectangular, corresponding round or more free-hand shapes as well as triangular shapes with rounded tips in order to facilitate the manufacture process. Further, the shape of the teeth may be a combination of different shapes e.g. rectangular at the sides and triangular in the center of the beam end or the surface shell structure.

The enlarged cross sectional view schematically illustrates the tooth 18 ready to be transported. After the manufacturing process of the teeth at the manufacturing plant the surface of the teeth is covered with adhesive means 23 in a controlled environment in order to prepare the adhesive means optimally for later use. The adhesive means is subsequently confined by a protection layer 24 e.g. an airtight layer of plastic. The layer is easily removed at the place of the assembly of the wind turbine blade sections into wind turbine blades. e.g. with the use of latent cure or hot melt technology.

Figure 13A:
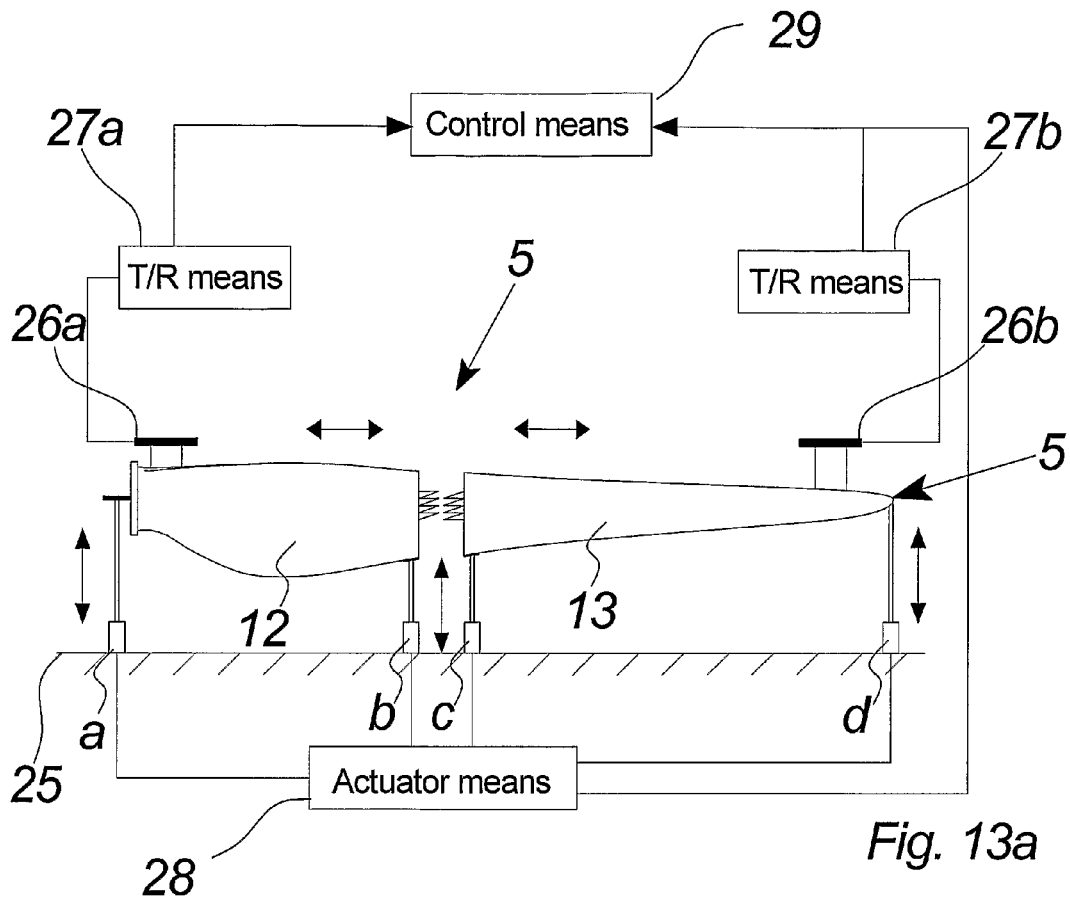
FIGS. 13a and 13b illustrate an embodiment of an on-site unit for positioning and assembling a wind turbine blade sections and controlling the conditions during the assembly.
Figure 13B:
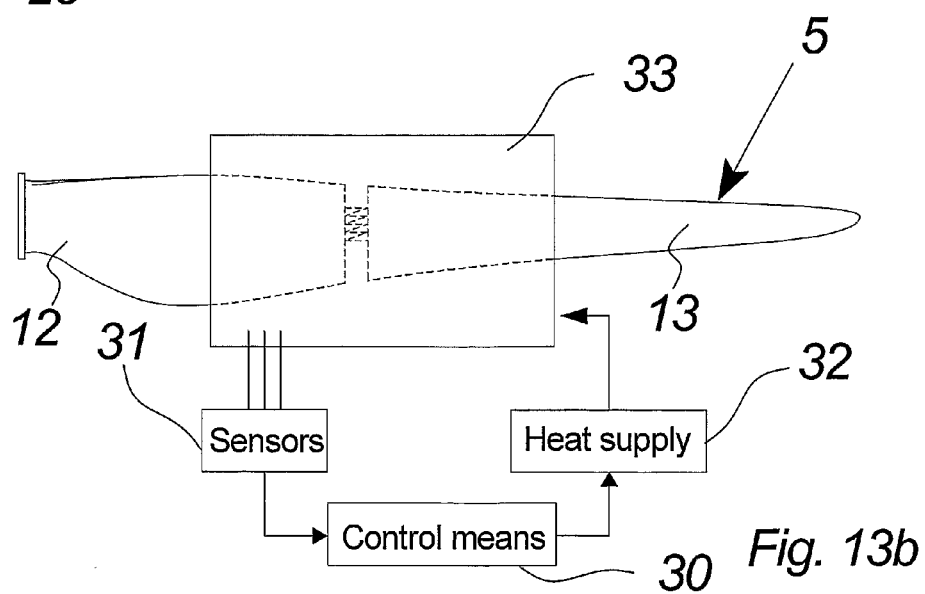

FIGS. 13a and 13b illustrate an embodiment of an on-site unit for positioning and assembling a wind turbine blade sections and controlling the conditions during the assembly.

FIG. 13a illustrates schematically an embodiment of an on-site unit for positioning and assembling a wind turbine blade 5.

The on-site unit includes a number of hydraulic or electric actuators a-d connected to the ends of the sections of the wind turbine blade. The sections are positioned in a distance from each other in order to move freely up and down. With the actuators and the actuator control means 28 it is possible to control the position of the sections in relation to each other and the ground 25. The position of the sections 12, 13 may be performed with a very high precision as the sections are provide with level measuring means in the form of a laser transmitter and receiver 26a, 26b with corresponding transmitter and receiver control means 27a, 27b.

The control means 27a, 27b, 28 of the actuators and the laser are connected to a control means 29 which controls the actuators to lift the sections to a position in which the laser receiver 26b sees the laser transmitter 26a. The wind turbine blade sections are perfectly aligned when the position is reached and the sections are thus ready to be forced against each other until they are seamlessly introduced into each other. The introduction may for example include the corresponding dentated beam ends (as illustrated on the figure) or dentated ends of the surface shell structures in an internal strengthening structure of a wind turbine blade. The introduction of the sections may be performed with one or more actuators forcing the sections horizontally against each other e.g. actuators forcing at the root and tip of the wind turbine blade toward the connection joint. The introduction is preferably performed quickly after the removal of the air tight protection cover from the dentated ends and thus the exposing of the adhering means on the connection surfaces.

FIG. 13b further illustrates the on-site unit of FIG. 13a in which the unit includes means for controlling the environmental conditions during connection of the wind turbine blade sections.

The unit includes a housing 33 such as a tent that separate the space at the joint connection of the sections 12, 13 from the exterior. The housing ensures that the conditions in the space may be controlled e.g. the temperature and humidity in the space. In order to survey the space conditions it comprises a number of sensors 31 e.g. temperature and humidity sensors. The sensors are connected to the control means 30 which controls heat supply 32 and/or humidity control to the housing as a result of the sensor measurements.

With the confined and controlled environment inside the housing it is possible to ensure an optimal adhesive connection between the corresponding dentated beam ends or surface shell structures in an internal strengthening structure of a wind turbine blade 5 e.g. a stronger and/or faster joint connection between the sections.

The invention has been exemplified above with reference to specific examples of the wind turbine sections including dentated ends. However, it should be understood that the invention is not limited to the particular examples described above but may be altered e.g. in size, shape, number of teethes and choice of materials. Further, it should be understood that wind turbine blade may be designed in a multitude of varieties within the scope of the invention as specified in the claims.

LIST

1. Wind turbine
2. Wind turbine tower
3. Wind turbine nacelle
4. Wind turbine hub
5. Wind turbine blade
6. Internal strengthening structure
6a. Internal beam strengthening structure
6b. Internal strengthening structure at the trailing edge
7. Surface shell structure of a wind turbine blade
8. Carbon fiber laminate
9. Glass fiber biax laminate
10. Carbon fiber strips
11. Wood or glass fiber strips
12. First section of a wind turbine blade
13. Second section of a wind turbine blade
14, 15. Corresponding dentated beam ends
16a, 17a. Corresponding dentated beam ends
16b, 17b. Corresponding dentated trailing edge ends
16c, 17c. Corresponding dentated beam end units
16d, 17d. Corresponding dentated trailing edge end units
18. Tooth of the dentated beam ends
19, 19a, 19b. Intermediate connection means
20. Cover surface
21. Joint connection of the wind turbine blade sections
22. Enlarged joint connection
23. Connection means e.g. an adhesive material
24. Protection cover or layer
25. Ground level at the place of erecting the wind turbine
26a, 26b. Transmitter and receiver for measuring relative positions
27a, 27b. Transmitter and receiver means for measuring signals
28. Actuator means
29. Control means for controlling the adhesive process
30. Control means for controlling the assembly process
31. Sensors e.g. temperature and humidity sensors
32. Heat supply
33. Enclosure enclosing the joint connection of the wind turbine blade sections
34. Wind blade root
35. Wind blade tip
a-d. Actuators
m. Longitudinal measuring line
n. Transverse line between the enlarged connection joint and the adjacent normal blade
l. Length of the teeth of a dentated beam end
L. Connection surface of the strengthening structure
$X_j$. Transverse length of an enlarged joint in the strengthening structure e.g. the largest length of the enlarged joint
$W_i$. Inner distance of the strengthening structure e.g. transverse length of the strengthening structure in proximity of the enlarged joint such as at the line n
$W_o$. Outer distance of the strengthening structure e.g. transverse length of the strengthening structure in proximity of the enlarged joint such as at the line n

| List | |
|---|---|
| 1. | Wind turbine |
| 2. | Wind turbine tower |
| 3. | Wind turbine nacelle |
| 4. | Wind turbine hub |
| 5. | Wind turbine blade |
| 6. | Internal strengthening structure |
| 6a. | Internal beam strengthening structure |
| 6b. | Internal strengthening structure at the trailing edge |
| 7. | Surface shell structure of a wind turbine blade |
| 8. | Carbon fiber laminate |
| 9. | Glass fiber biax laminate |
| 10. | Carbon fiber strips |
| 11. | Wood or glass fiber strips |
| 12. | First section of a wind turbine blade |
| 13. | Second section of a wind turbine blade |
| 14, 15. | Corresponding dentated beam ends |
| 16a, 17a. | Corresponding dentated beam ends |
| 16b, 17b. | Corresponding dentated trailing edge ends |
| 16c, 17c. | Corresponding dentated beam end units |
| 16d, 17d. | Corresponding dentated trailing edge end units |
| 18. | Tooth of the dentated beam ends |
| 19, 19a, 19b. | Intermediate connection means |
| 20. | Cover surface |
| 21. | Joint connection of the wind turbine blade sections |
| 22. | Enlarged joint connection |
| 23. | Connection means e.g. an adhesive material |
| 24. | Protection cover or layer |
| 25. | Ground level at the place of erecting the wind turbine |
| 26a, 26b. | Transmitter and receiver for measuring relative positions |
| 27a, 27b. | Transmitter and receiver means for measuring signals |
| 28. | Actuator means |
| 29. | Control means for controlling the adhesive process |
| 30. | Control means for controlling the assembly process |
| 31. | Sensors e.g. temperature and humidity sensors |
| 32. | Heat supply |
| 33. | Enclosure enclosing the joint connection of the wind turbine blade sections |
| 34. | Wind blade root |
| 35. | Wind blade tip |
| a-d. | Actuators |
| m. | Longitudinal measuring line |
| n. | Transverse line between the enlarged connection joint and the adjacent normal blade |
| l. | Length of the teeth of a dentated beam end |
| L. | Connection surface of the strengthening structure |
| $X_j$. | Transverse length of an enlarged joint in the strengthening structure e.g. the largest length of the enlarged joint |
| $W_i$. | Inner distance of the strengthening structure e.g. transverse length of the strengthening structure in proximity of the enlarged joint such as at the line n |
| $W_o$. | Outer distance of the strengthening structure e.g. transverse length of the strengthening structure in proximity of the enlarged joint such as at the line n |

The invention claimed is:

1. A wind turbine blade comprising:
at least two wind turbine blade sections which are separated, said separate sections including one or more strengthening structures comprising at least one of an internal beam strengthening structure, an internal strengthening structure at the trailing edge, or an internal strengthening structure of a surface shell structure, said strengthening structures including ends that are connected in a connection joint, said strengthening structures extending along a longitudinal direction of said wind turbine blade sections and defining a transverse cross section oriented transverse to the longitudinal direction,
wherein said ends are at least partially shaped as dentated ends which include corresponding connection surfaces, one or more relevant dimensions of said connection surfaces being larger than corresponding dimensions of transverse surfaces of the strengthening structures at said ends, wherein one or more of said corresponding dimensions of transverse surfaces at said connection joint is enlarged in relation to a dimension of a transverse surface at a location adjacent to said connection joint, such that said transverse cross section of said strengthening structure is enlarged at said connection joint compared to the location adjacent to said connection joint, and wherein an adhesive on the connection surfaces adheres the connection surfaces to each other.

2. The wind turbine blade according to claim 1 wherein teeth of said dentated ends are shaped as triangles, four-sided teeth, round shapes, freehand shapes, or a combination of different shapes.

3. The wind turbine blade according to claim 2 wherein sides of the teeth comprise a pie shape comprising rounded or wedge shaped teeth in order to establish corners in a strengthening structure.

4. The wind turbine blade according to claim 1 wherein said dentated ends partly corresponding to each other and cavities are filled with one or more intermediate connectors.

5. The wind turbine blade according to claim 4 wherein the adhesive adheres the corresponding dentated ends and/or said one or more intermediate connectors to each other.

6. The wind turbine blade according to claim 1 wherein said one or more relevant dimensions of said connection surfaces, transverse surfaces, connection joint and adjacent strengthening structure may be area, length or thickness values.

7. The wind turbine blade according to claim 1 wherein said one or more relevant dimensions of said connection joint is larger than that of the adjacent strengthening structure in a direction of a root of the wind turbine blade.

8. The wind turbine blade according to claim 2 wherein the length l of one of said teeth in an enlarged connection joint is given by $$\ell \geq \frac{\sigma_{carbon} \cdot h_1 \cdot b}{\tau_{epoxy} \cdot h_2 \cdot 2} = \frac{1000 \cdot h_1 \cdot b}{10 \cdot h_2 \cdot 2} = 50 \frac{h_1}{h_2} \cdot b$$

in which the $h_1$ is the adjacent height of the strengthening structure and $h_2$ is the enlarged height of said tooth at the same width b, said height $h_2$ being between 2 and 10 times the size of $h_1$.

9. The wind turbine blade according to claim 2 wherein a number of teeth in the dentated ends is between 25 and 200 per meter of strengthening structure.

10. The wind turbine blade according to claim 1 wherein said one or more strengthening structures include a plurality of oblong strips imbedded in a blade surface comprising carbon, wood and/or glass fiber strips.

11. The wind turbine blade according to claim 1 wherein enlargement of said connection joint is symmetrical in relation to the adjacent strengthening structure comprising a symmetrical in- and outwardly expansion in relation to a course of the adjacent strengthening structure.

12. A wind turbine blade comprising at least two wind turbine blade sections which are separated, said separate sections including one or more strengthening structures comprising at least one of an internal beam strengthening structure, an internal strengthening structure at the trailing edge, or an internal strengthening structure of a surface shell structure with a number of substantially oblong carbon fiber strips and strips of one or more further materials, wherein said strengthening structures include ends that are connected in a connection joint, said strengthening structures extending along a longitudinal direction of said wind turbine blade sections and defining a transverse cross section oriented transverse to the longitudinal direction, wherein said ends are at least partially shaped as dentated ends which include corresponding connection surfaces, one or more relevant dimensions of said surfaces being larger than corresponding dimensions of transverse surfaces of the strengthening structures at said ends, wherein one or more of said dimensions of transverse surfaces of the strengthening structures at said connection joint is enlarged in relation to a dimension of a transverse surface at a location adjacent to said connection joint, such that said transverse cross section of said strengthening structure is enlarged at said connection joint compared to the location adjacent to said connection joint, and wherein an adhesive on the connection surfaces adheres the connection surfaces to each other.

13. The wind turbine blade according to claim 12 wherein the carbon fibers of said substantially oblong carbon fiber strips in each wind turbine blade section are unbroken.

14. The wind turbine blade according to claim 12 wherein the corresponding ends of said carbon fiber strips are connected and corresponding ends of said strips of one or further materials are connected to the connection joint.

15. The wind turbine blade according to claim 12 wherein teeth of said dentated ends are shaped as triangles, four-sided teeth, round shapes, freehand shapes, or a combination of different shapes.

16. The wind turbine blade according to claim 15 wherein sides of the teeth comprise a pie shape comprising rounded or wedge shaped teeth in order to establish corners in a strengthening structure.

17. The wind turbine blade according to claim 15 wherein a length of one of said teeth in connection joint is given by $$\ell \geq \frac{\sigma_{carbon} \cdot b}{\tau_{epoxy} \cdot 2} = \frac{1000 \cdot b}{10 \cdot 2} = 50 \cdot b$$

in which b is a width of the teeth, and in which a height of the connection joint and an adjacent height of the strengthening structure are the same or substantially the same.

18. The wind turbine blade according to claim 15 wherein the number of teeth in the dentated ends is between 25 and 200 per meter of blade surface.

19. The wind turbine blade according to claim 12 wherein said dentated ends partly corresponding to each other and cavities are filled with one or more intermediate connectors.

20. The wind turbine blade according to claim 19 wherein the adhesive adheres the corresponding dentated ends and/or said one or more intermediate connectors to each other.

21. The wind turbine blade according to claim 12 wherein said one or more strengthening structures include a plurality of oblong strips imbedded in a blade surface comprising carbon, wood and/or glass fiber strips.

22. The wind turbine blade according to claim 12 wherein said connection joint is enlarged in relation to the adjacent strengthening structure.

23. The wind turbine blade according to claim 22 wherein a length l of one of said teeth in the enlarged connection joint is given by $$\ell \geq \frac{\sigma_{carbon} \cdot h_1 \cdot b}{\tau_{epoxy} \cdot h_2 \cdot 2} = \frac{1000 \cdot h_1 \cdot b}{10 \cdot h_2 \cdot 2} = 50 \frac{h_1}{h_2} \cdot b$$

in which the $h_1$ is an adjacent height of the strengthening structure and $h_2$ is an enlarged height of said tooth at a same width b, said height $h_2$ being between 2 and 10 the size of $h_1$.

24. The wind turbine blade according to claim 22 wherein said one or more relevant dimensions of said connection joint is larger than that of the adjacent strengthening structure in a direction of a root of the wind turbine blade.

25. The wind turbine blade according to claim 22 wherein the enlargement of said connection joint is symmetrical in relation to the adjacent strengthening structure comprising a symmetrical in- and outwardly expansion in relation to a course of the adjacent strengthening structure.

26. The wind turbine blade according to claim 22 wherein said one or more relevant dimensions of said connection surfaces, transverse surfaces, said connection joint and adjacent strengthening structure comprises area, length or thickness values.

27. The wind turbine blade according to claim 12 wherein the connection joint is covered with a cover surface.

28. A wind turbine blade section to be used in a wind turbine blade, wherein said blade section comprises:
a strengthening structure comprising at least one of an internal beam strengthening structure, an internal strengthening structure at the trailing edge, or an internal strengthening structure of a surface shell structure with an end including a connection surface for connection to another blade section at a connection joint, wherein said end is at least partially shaped as dentated ends, said strengthening structure extending along a longitudinal direction of the wind turbine blade section and defining a transverse cross section oriented transverse to the longitudinal direction,
one or more relevant dimensions of said surface being larger than dimensions of transverse surfaces of the strengthening structures at said end,
wherein one or more of said dimensions of transverse surfaces of the strengthening structures at said end is enlarged in relation to a dimension of a transverse surface at a location adjacent to the end and the connection joint, such that said transverse cross section of said strengthening structure is enlarged at the connection joint compared to the location adjacent to the connection joint, and
wherein said structure end includes a connection surface applied with a connector concealed behind a removable cover.

29. The wind turbine blade section according to claim 28 wherein said connector is an adhesive is concealed behind air tight plastic layers of the removable cover with use of latent cure or hot melt technology.

* * * * *